(12) United States Patent
Wang et al.

(10) Patent No.: US 12,732,971 B2
(45) Date of Patent: Sep. 8, 2026

(54) METHOD AND APPARATUS SUPPORTING RESOURCE CONFIGURATION FOR SIGNAL TRANSMISSION IN WIRELESS COMMUNICATION SYSTEM

(71) Applicant: Samsung Electronics Co., Ltd., Suwon-si (KR)

(72) Inventors: Yi Wang, Beijing (CN); Feifei Sun, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 290 days.

(21) Appl. No.: 17/766,869

(22) PCT Filed: Sep. 3, 2020

(86) PCT No.: PCT/KR2020/011879
§ 371 (c)(1),
(2) Date: Apr. 6, 2022

(87) PCT Pub. No.: WO2021/080164
PCT Pub. Date: Apr. 29, 2021

(65) Prior Publication Data

US 2024/0080811 A1 Mar. 7, 2024

(30) Foreign Application Priority Data

Oct. 25, 2019 (CN) ......................... 201911025040.0
Apr. 15, 2020 (CN) ......................... 202010297077.5

(51) Int. Cl.
*H04W 72/044* (2023.01)

(52) U.S. Cl.
CPC ................................ *H04W 72/044* (2013.01)

(58) Field of Classification Search
CPC ........... H04W 72/044; H04W 72/0446; H04W 72/0453; H04W 72/1263; H04W 72/535;
(Continued)

(56) References Cited

U.S. PATENT DOCUMENTS

2016/0143013 A1* 5/2016 Kim .................... H04J 13/0062 370/329
2019/0190687 A1* 6/2019 Yi ............................ H04L 5/18
(Continued)

FOREIGN PATENT DOCUMENTS

KR 10-2019-0010887 A 1/2019
WO 2019/026216 A1 2/2019
WO 2019/095326 A1 5/2019

OTHER PUBLICATIONS

NTT Docomo, Inc., Discussion on cross-link interference mitigation for duplexing flexibility, R1-1713969, 3GPP TSG RAN WG1 Meeting #90, Aug. 20, 2017, Prague, Czechia.
(Continued)

*Primary Examiner* — Benjamin H Elliott, IV
(74) *Attorney, Agent, or Firm* — Jefferson IP Law, LLP

(57) ABSTRACT

The present disclosure relates to a 5G communication system or a 6G communication system for supporting higher data rates beyond a 4G communication system such as long term evolution (LTE). Provided is a signal transmission method and device for User Equipment (UE). The signal transmission method for UE includes: receiving information for determining an uplink/downlink attribute of each frequency domain resource in each slot/symbol transmitted by the base station; determining the uplink/downlink attribute of each time-frequency resource according to the information for determining the uplink/downlink attribute of each frequency domain resource in each slot/symbol; and performing signal transmission according to the determined uplink/downlink attribute of each time-frequency resource.

19 Claims, 6 Drawing Sheets

(58) Field of Classification Search
CPC ...... H04W 72/23; H04L 5/001; H04L 5/0044; H04L 5/0048; H04L 5/0051; H04L 5/0053; H04L 5/0058; H04L 5/005; H04L 5/0064; H04L 5/0007
See application file for complete search history.

(56) References Cited

U.S. PATENT DOCUMENTS

| | | | | |
|---|---|---|---|---|
| 2019/0245648 | A1* | 8/2019 | Jo | H04W 72/12 |
| 2019/0268903 | A1* | 8/2019 | Lee | H04W 72/23 |
| 2020/0163068 | A1* | 5/2020 | Takeda | H04W 72/044 |
| 2020/0275443 | A1* | 8/2020 | Zhang | H04W 72/0446 |
| 2020/0351837 | A1* | 11/2020 | Hwang | H04L 5/0078 |
| 2021/0091899 | A1* | 3/2021 | Wu | H04W 72/23 |
| 2021/0227515 | A1* | 7/2021 | Takahashi | H04L 5/001 |
| 2021/0234664 | A1* | 7/2021 | Levitsky | H04W 52/42 |
| 2021/0345260 | A1* | 11/2021 | Zhu | H04W 24/10 |
| 2023/0007641 | A1* | 1/2023 | Kim | H04W 72/044 |
| 2023/0132757 | A1* | 5/2023 | Kang | H04B 7/08 370/329 |
| 2023/0224880 | A1* | 7/2023 | Xiong | H04L 5/0044 370/329 |
| 2024/0040563 | A1* | 2/2024 | Choi | H04L 5/0053 |
| 2024/0080811 | A1* | 3/2024 | Wang | H04L 5/0048 |

OTHER PUBLICATIONS

European Search Report dated Sep. 15, 2022, issued in European Application No. 20879747.2.

Indian Office Action dated Mar. 1, 2024, issued in Indian Patent Application No. 202217026360.

Huawei, HiSilicon; Summary of remaining issues on group-common PDCCH; 3GPP TSG RAN WG1 Ad Hoc Meeting, R1-1800069; Jan. 13, 2018, Vancouver, Canada.

ZTE, Sanechips; Remaining aspects related to FDD; 3GPP TSG RAN WG1 Meeting AH 1801, R1-1800142; Jan. 13, 2018, Vancouver, Canada.

Qualcomm Incorporated; Summary on remaining issues on GC-PDCCH carrying SFI; 3GPP TSG RAN WG1 #92, R1-1803270; Feb. 26, 2018, Athens, Greece.

European Examination Report dated Apr. 11, 2025, issued in European Patent Application No. 20879747.2.

LG Electronics, Motivation for new SI: Study on Flexible and Full Duplex for NR, RP-190265, 3GPP TSG RAN #83, Mar. 14, 2019.

Korean Office Action dated Sep. 2, 2025, issued in Korean Patent Application No. 10-2020-0112628.

CEWiT, Need for study on In-Band Full Duplex communication, R1-163310, 3GPP TSG-RAN WG1Meeting #84bis, Apr. 11, 2016.

Indian Hearing Notice dated Mar. 30, 2026 issued in Indian Patent Application No. 202217026360.

Korean Office Action Jul. 23, 2026, issued in Korean Patent Application No. 10-2020-0112628.

* cited by examiner

METHOD AND APPARATUS SUPPORTING RESOURCE CONFIGURATION FOR SIGNAL TRANSMISSION IN WIRELESS COMMUNICATION SYSTEM

CROSS-REFERENCE TO RELATED APPLICATION(S)

This application is a U.S. National Stage application under 35 U.S.C. § 371 of an International application number PCT/KR2020/011879, filed on Sep. 3, 2020, which is based on and claimed priority of a Chinese patent application number 201911025040.0, filed on Oct. 25, 2019, and of a Chinese patent application number 202010297077.5, filed on Apr. 15, 2020, in the Chinese Intellectual Property Office, the disclosure of each of which is incorporated by reference herein in its entirety.

TECHNICAL FIELD

The present disclosure relates to a field of wireless communication technology, and more particularly, to a signal transmission method and device for UE.

BACKGROUND ART

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

Existing communication systems are usually divided into a Time Division Duplex (TDD) system and a Frequency Division Duplex (FDD) system. In the TDD system, a base station can configure the uplink/downlink attributes (i.e., uplink transmission slot/symbol, downlink transmission slot/symbol, and flexible slot/symbol symbol) in different time resources on one carrier through a semi-static signaling and a dynamic signaling. In the FDD system, the base station can configure the different time resources of the uplink carrier in a pair of uplink and downlink carriers as uplink transmission slots/symbols or flexible slots/symbols, and can configure the different time resources of the downlink carrier as downlink transmission slots/symbols or flexible slots/symbols.

Compared with the FDD system, since the uplink and downlink transmission is time-division multiplexed in the TDD system, the time delay of the uplink or the downlink transmission is relatively large. For example, according to one type of uplink and downlink configuration, in a 10 ms (millisecond) cycle, only a 1 ms slot is for the uplink transmission, other slots are all for the downlink transmission or the flexible transmission, and the maximum delay of the uplink transmission is 10 ms. In order to reduce the transmission delay, it may be considered to divide a part of frequency domain resources in one carrier into uplink transmission resources, and the other part into downlink transmission resources. In order to reduce the interference between the uplink transmission and the downlink transmission of the same carrier, uplink and downlink interference can be reduced by means of guard bands and filtering.

DISCLOSURE OF INVENTION

Solution to Problem

According to an exemplary embodiment of the present disclosure, there is provided a signal transmission method for UE, comprising: receiving information for determining an uplink/downlink attribute of each frequency domain resource in each slot/symbol transmitted by the base station; determining the uplink/downlink attribute of each time-frequency resource according to the information for determining the uplink/downlink attribute of each frequency domain resource in each slot/symbol; and performing signal transmission according to the determined uplink/downlink attribute of each time-frequency resource.

Alternatively, the information for determining the uplink/downlink attribute of each frequency domain resource in each slot/symbol may comprise at least one of cell common UL/DL information, UE-specific UL/DL information, and dynamic UL/DL information. Wherein the cell common UL/DL information comprises a first type of cell common UL/DL information and/or a second type of cell common UL/DL information, the UE-specific UL/DL information comprises a first type of UE-specific UL/DL information and/or a second type of UE-specific UL/DL information, the dynamic UL/DL information comprises a first type of dynamic UL/DL information and/or a second type of dynamic UL/DL information.

Alternatively, the first type of cell common UL/DL information, the first type of UE-specific UL/DL information and the first type of dynamic UL/DL information may comprise information on the uplink/downlink attribute in the time dimension, and may be used to indicate that one slot/symbol is an uplink slot/symbol, a downlink slot/symbol or a flexible slot/symbol, wherein the uplink/downlink attributes of all frequency domain resources in each slot/symbol may be the same, the second type of cell common UL/DL information, the second type of UE-specific UL/DL information and the second type of dynamic UL/DL information may comprise information on the uplink/downlink attributes in the time dimension and the frequency domain dimension, and may be used to indicate that each frequency domain resource of one slot/symbol is an uplink transmission resource, a downlink transmission resource, or a flexible transmission resource.

Alternatively, the second type of cell common UL/DL information, the second type of UE-specific UL/DL information, and the second type of dynamic UL/DL information may be used to indicate the uplink/downlink attribute of each frequency domain region in a carrier where the cell is located.

Alternatively, the second type of UE-specific UL/DL information and the second type of dynamic UL/DL information may be used to indicate the uplink/downlink attributes of the configured BWPs, wherein the uplink/downlink attributes of different BWPs are configured separately.

Alternatively, the uplink/downlink attribute of each frequency domain resource of one slot/symbol in one BWP may be configured separately, and the uplink/downlink attributes of different frequency domain resources cannot be conflicting, or the uplink/downlink attributes of different frequency domain resources are conflicting, wherein the confliction means that the uplink attribute and the downlink attribute appear simultaneously in different frequency domain resources.

Alternatively, for one slot/symbol, there are no more than two types of uplink/downlink attribute for each frequency domain resource within one carrier bandwidth or within one BWP, or, for one slot/symbol, the frequency domain resources within the carrier bandwidth only support a specific uplink/downlink attribute combination.

Alternatively, in a specific slot/symbol, all frequency domain regions are configured with the same uplink/downlink attribute, or, in the specific slot/symbol, different frequency domain regions are not configured with conflicting uplink/downlink attributes, or, in the specific slot/symbol, a specific frequency domain region is configured with a specific uplink/downlink attribute.

Alternatively, both of the first type of cell common UL/DL information and the second type of cell common UL/DL information indicate the uplink/downlink attributes of the frequency domain regions in the symbols, and the indicated part of frequency domain regions have the same uplink/downlink attribute, or, both of the first type of UE-specific UL/DL information and the second type of UE-specific UL/DL information indicate the uplink/downlink attributes of the frequency domain regions in the symbols, and the indicated part of frequency domain regions have the same uplink/downlink attribute, or, both of the first type of semi-static UL/DL information and the second type of dynamic UL/DL information indicate the uplink/downlink attributes of the frequency domain regions in the symbols, and the indicated part of frequency domain regions have the same uplink/downlink attribute, wherein the first type of semi-static UL/DL information comprises the first type of cell common UL/DL information and/or the first type of UE-specific UL/DL information, wherein at least part of the frequency domain resources are configured by the base station or are predefined.

Alternatively, the determining of the uplink/downlink attribute of each time-frequency resource may comprise: determining the uplink/downlink attribute of each time-frequency resource according to the second type of cell common UL/DL information or according to the first type of cell common UL/DL information and the second type of cell common UL/DL information, or, determining the uplink/downlink attribute of each frequency domain region of the carrier where the serving cell is located according to the second type of UE-specific UL/DL information and the first type of cell common UL/DL information, or, determining the uplink/downlink attribute of each frequency domain region of the carrier where the serving cell is located only according to the second type of UE-specific UL/DL information.

Alternatively, the determining of the uplink/downlink attribute of each time-frequency resource may comprise: determining the uplink/downlink attribute of each slot/symbol of the BWP according to a frequency domain position of the BWP and each frequency domain region of the carrier where the serving cell is located, wherein each frequency domain region in the carrier where the serving cell is located is indicated by at least one of the second type of cell common UL/DL information, the second type of UE-specific UL/DL information, and the second type of dynamic UL/DL information.

Alternatively, the performing of signal transmission according to the determined uplink/downlink attribute of each time-frequency resource may comprise: determining the frequency domain resource parameters for downlink transmission or uplink transmission according to a first bandwidth BW1, when a bandwidth for downlink transmission, or a bandwidth for uplink transmission, or a bandwidth for downlink transmission and flexible transmission, or a bandwidth for uplink transmission and flexible transmission within the BWP bandwidth determined according to the second type of UE-specific UL/DL information is the BW1, or, determining the frequency domain resource parameters for downlink or uplink transmission according to a second bandwidth BW2, when the bandwidth for downlink transmission, or the bandwidth for uplink transmission, or the bandwidth for downlink transmission and flexible transmission, or the bandwidth for uplink transmission and flexible transmission within the BWP bandwidth determined according to the second type of cell common UL/DL information is the BW2, or, determining the frequency domain resource parameters for downlink or the uplink transmission according to a third bandwidth BW3, when the bandwidth for downlink transmission, or the bandwidth for uplink transmission, or the bandwidth for downlink transmission and flexible transmission, or the bandwidth for uplink transmission and flexible transmission within the BWP bandwidth determined according to the second type of dynamic UL/DL information is the BW3.

Alternatively, frequency domain resources allocated by the base station for PDSCH or PUSCH are limited within the BW1, or, the frequency domain resources allocated by the base station for the PDSCH or the PUSCH are limited within the BW2, or, a transmission bandwidth configured by the base station for CSI-RS or SRS is limited within the BW1, or, when at least part of the transmission bandwidth of the CSI-RS or the SRS is located outside of the BW1, the CSI-RS outside of the BW1 is not received by the UE, or the SRS outside of the BW1 is not transmitted by the UE, or, when at least part of the transmission bandwidth of the CSI-RS or the SRS based on configuration is located outside of the BW3, the CSI-RS outside of the BW3 is not received by the UE, or the SRS outside of the BW3 is not transmitted by the UE, or the CSI-RS is not received by the UE, or the SRS is not transmitted by the UE, or, when at least part of the transmission bandwidth of the PDSCH, the PUSCH, Physical Uplink Control Channel (PUCCH) or Physical Random Access Channel (PRACH) based on configuration is located outside of the BW3, the PDSCH, the PUSCH, the PUCCH or the PRACH outside of the BW3 is not received or transmitted by the UE, or, the PDSCH, the PUSCH, the PUCCH or the PRACH is not received or transmitted by the UE, or, when at least part of the transmission bandwidth of the PDSCH, the PUSCH, the PUCCH or the PRACH based on configuration is located outside of the BW3, the frequency domain resources outside of the BW3 are not mapped to by means of rate matching or puncturing.

Alternatively, the determining of the frequency domain resource parameters for downlink transmission or uplink transmission may comprise: determining the number of bits for frequency domain resource allocation bit field in the DCI for scheduling the PDSCH or the PUSCH according to the BW1, or, determining the number of bits for frequency domain resource allocation bit field in the DCI for scheduling the PDSCH or the PUSCH and located in the UE-specific search space according to the BW1, and determining the number of bits for frequency domain resource allocation bit field in the DCI located in the cell common search space according to the BWP bandwidth, or, determining the number of bits for frequency domain resource allocation bit field in normal DCI for scheduling the PDSCH or the PUSCH according to the BW1, and determining the number of bits for frequency domain resource allocation bit field in fallback DCI according to the BWP bandwidth, or, determining the number of bits for frequency domain resource allocation bit field in the DCI for scheduling the PDSCH or the PUSCH and located in the UE-specific search space according to the BW1, and determining the number of bits for frequency domain resource allocation bit field in the DCI located in the cell common search space according to the BW2, or, determining the number of bits for frequency domain resource allocation bit field in the normal DCI for scheduling the PDSCH or the PUSCH according to the BW1, and determining the number of bits for frequency domain resource allocation bit field in the fallback DCI according to the BW2 .

Alternatively, the determining of the frequency domain resource parameters for downlink transmission or uplink transmission may comprise: determining a RBG (Resource Block Group) size according to the BW1 when the frequency domain resources of the PDSCH or the PUSCH are allocated based on the RBG, or, determining a RBG size of the PDSCH or the PUSCH scheduled by DCI located in a UE-specific search space according to the BW1, and determining a RBG size of the PDSCH or the PUSCH scheduled by DCI located in a common search space according to the BWP bandwidth, or, determining a RBG size of the PDSCH or the PUSCH scheduled by normal DCI according to the BW1, and determining a RBG size of the PDSCH or the PUSCH scheduled by fallback DCI according to the BWP bandwidth, or, determining the RBG size of the PDSCH or the PUSCH scheduled by the DCI located in the UE-specific search space according to the BW1, and determining the RBG size of the PDSCH or the PUSCH scheduled by the DCI located in the common search space according to the BW2, or, determining the RBG size of the PDSCH or the PUSCH scheduled by the normal DCI according to the BW1, and determining the RBG size of the PDSCH or the PUSCH scheduled by the fallback DCI according to the BW2 , or, determining an interleaving depth according to the BW1 when the frequency domain resources of the PDSCH or the PUSCH are allocated based on interleaving, or, determining an interleaving depth of the PDSCH or the PUSCH scheduled by the DCI located in the UE-specific search space according to the BW1, and determining an interleaving depth of the PDSCH or the PUSCH scheduled by the DCI located in the common search space according to the BWP bandwidth, or, determining an interleaving depth of the PDSCH or the PUSCH scheduled by the normal DCI according to the BW1 , and determining an interleaving depth of the PDSCH or the PUSCH scheduled by the fallback DCI according to the BWP bandwidth, or, determining the interleaving depth of the PDSCH or the PUSCH scheduled by the DCI located in the UE-specific search space according to the BW1, and determining the interleaving depth of the PDSCH or the PUSCH scheduled by the DCI located in the common search space according to the BW2, or, determining the interleaving depth of the PDSCH or the PUSCH scheduled by the normal DCI according to the BW1, and determining the interleaving depth of the PDSCH or the PUSCH scheduled by the fallback DCI according to the BW2 .

Alternatively, the performing of signal transmission according to the determined uplink/downlink attribute of each time-frequency resource may comprise: when at least part of the frequency domain resources in a group of Physical Resource Blocks (PRB) are uplink resources, the group of PRBs are not configured as a Control Resource Set (CORESET) frequency domain resource by the base station, or, when at least part of frequency domain resources in one PDCCH candidate are the uplink resources, the one PDCCH candidate is not monitored by the UE, or, when at least part of frequency domain resources in one PDCCH candidate are the uplink resources or flexible resources, the one PDCCH candidate is not monitored by the UE.

According to an exemplary embodiment of the present disclosure, there is provided a signal transmission device for UE, comprising: an information receiving unit, configured to receive information for determining an uplink/downlink attribute of each frequency domain resource in each slot/symbol transmitted by the base station; an attribute determining unit, configured to determine the uplink/downlink attribute of each time-frequency resource according to the information for determining the uplink/downlink attribute of each frequency domain resource in each slot/symbol; and a signal transmission unit, configured to performing signal transmission according to the determined uplink/downlink attribute of each time-frequency resource.

Alternatively, the information for determining the uplink/downlink attribute of each frequency domain resource in each slot/symbol may comprise at least one of cell common UL/DL information, UE-specific UL/DL information, and dynamic UL/DL information. Wherein the cell common UL/DL information comprises a first type of cell common UL/DL information and/or a second type of cell common UL/DL information, the UE-specific UL/DL information comprises a first type of UE-specific UL/DL information and/or a second type of UE-specific UL/DL information, the dynamic UL/DL information comprises a first type of dynamic UL/DL information and/or a second type of dynamic UL/DL information.

Alternatively, the first type of cell common UL/DL information, the first type of UE-specific UL/DL information and the first type of dynamic UL/DL information may comprise information on the uplink/downlink attribute in the time dimension, and may be used to indicate that one slot/symbol is an uplink slot/symbol, a downlink slot/symbol or a flexible slot/symbol, wherein the uplink/downlink attributes of all frequency domain resources in each slot/symbol may be the same, the second type of cell common UL/DL information, the second type of UE-specific UL/DL information and the second type of dynamic UL/DL information may comprise information on the uplink/downlink attribute in the time dimension and the frequency domain dimension, and may be used to indicate that each frequency domain resource of one slot/symbol is an uplink transmission resource, a downlink transmission resource, or a flexible transmission resource.

Alternatively, the second type of cell common UL/DL information, the second type of UE-specific UL/DL information, and the second type of dynamic UL/DL information may be used to indicate the uplink/downlink attribute of each frequency domain region in a carrier where the cell is located.

Alternatively, the second type of UE-specific UL/DL information and the second type of dynamic UL/DL information may be used to indicate the uplink/downlink attributes of the configured BWPs, wherein the uplink/downlink attributes of different BWPs are configured separately.

Alternatively, the uplink/downlink attribute of each frequency domain resource of one slot/symbol in one BWP may be configured separately, and the uplink/downlink attributes of different frequency domain resources cannot be conflicting, or the uplink/downlink attributes of different frequency domain resources are conflicting, wherein the confliction means that the uplink attribute and the downlink attribute appear simultaneously in different frequency domain resources.

Alternatively, for one slot/symbol, there are no more than two types of uplink/downlink attribute for each frequency domain resource within one carrier bandwidth or within one BWP, or, for one slot/symbol, the frequency domain resources within the carrier bandwidth only support a specific uplink/downlink attribute combination.

Alternatively, in a specific slot/symbol, all frequency domain regions are configured with the same uplink/downlink attribute, or, in the specific slot/symbol, different frequency domain regions are not configured with conflicting uplink/downlink attributes, or, in the specific slot/symbol, a specific frequency domain region is configured with a specific uplink/downlink attribute.

Alternatively, both of the first type of cell common UL/DL information and the second type of cell common UL/DL information indicate the uplink/downlink attributes of the frequency domain regions in the symbols, and the indicated part of frequency domain regions have the same uplink/downlink attribute, or, both of the first type of cell common UL/DL information and the second type of UE-specific UL/DL information indicate the uplink/downlink attributes of the frequency domain regions in the symbols, and the indicated part of frequency domain regions have the same uplink/downlink attribute, or, both of the first type of semi-static UL/DL information and the second type of dynamic UL/DL information indicate the uplink/downlink attributes of the frequency domain regions in the symbols, and the indicated part of frequency domain regions have the same uplink/downlink attribute, wherein the first type of semi-static UL/DL information comprises the first type of cell common UL/DL information and/or the first type of UE-specific UL/DL information, wherein at least part of the frequency domain resources are configured by the base station or are predefined.

Alternatively, the attribute determining unit may be configured to determine the uplink/downlink attribute of each time-frequency resource according to the second type of cell common UL/DL information or according to the first type of cell common UL/DL information and the second type of cell common UL/DL information, or, to determine the uplink/downlink attribute of each frequency domain region of in the carrier where the serving cell is located according to the second type of UE-specific UL/DL information and the first type of cell common UL/DL information, or, to determine the uplink/downlink attribute of each frequency domain region of the carrier where the serving cell is located only according to the second type of UE-specific UL/DL information.

Alternatively, the attribute determining unit may be configured to determine the uplink/downlink attribute of each slot/symbol of the BWP according to a frequency domain position of the BWP and each frequency domain region of the carrier where the serving cell is located, wherein each frequency domain region in the carrier where the serving cell is located is indicated by at least one of the second type of cell common UL/DL information, the second type of UE-specific UL/DL information, and the second type of dynamic UL/DL information.

Alternatively, the signal transmission unit may be configured to determine the frequency domain resource parameters for downlink transmission or uplink transmission according to a first bandwidth BW1, when a bandwidth for downlink transmission, or a bandwidth for uplink transmission, or a bandwidth for downlink transmission and flexible transmission, or a bandwidth for uplink transmission and flexible transmission within the BWP bandwidth determined according to the second type of UE-specific UL/DL information is the BW1, or, to determine the frequency domain resource parameters for downlink or uplink transmission according to a second bandwidth BW2, when the bandwidth for downlink transmission, or the bandwidth for uplink transmission, or the bandwidth for downlink transmission and flexible transmission, or the bandwidth for uplink transmission and flexible transmission within the BWP bandwidth determined according to the second type of cell common UL/DL information is the BW2, or, to determine the frequency domain resource parameters for downlink or the uplink transmission according to a third bandwidth BW3, when the bandwidth for downlink transmission, or the bandwidth for uplink transmission, or the bandwidth for downlink transmission and flexible transmission, or the bandwidth for uplink transmission and flexible transmission within the BWP bandwidth determined according to the second type of dynamic UL/DL information is the BW3.

Alternatively, frequency domain resources allocated by the base station for PDSCH or PUSCH are limited within the BW1, or, the frequency domain resources allocated by the base station for the PDSCH or the PUSCH are limited within the BW2 , or, a transmission bandwidth configured by the base station for CSI-RS or SRS is limited within the BW1, or, when at least part of the transmission bandwidth of the CSI-RS or the SRS is located outside of the BW1, the CSI-RS outside of the BW1 is not received by the UE, or the SRS outside of the BW1 is not transmitted by the UE, or, when at least part of the transmission bandwidth of the CSI-RS or the SRS based on configuration is located outside of the BW3, the CSI-RS outside of the BW3 is not received by the UE, or the SRS outside of the BW3 is not transmitted by the UE, or the CSI-RS is not received by the UE, or the SRS is not transmitted by the UE, or, when at least part of the transmission bandwidth of the PDSCH, the PUSCH, Physical Uplink Control Channel (PUCCH) or Physical Random Access Channel (PRACH) based on configuration is located outside of the BW3, the PDSCH, the PUSCH, the PUCCH or the PRACH outside of the BW3 is not received or transmitted by the UE, or, the PDSCH, the PUSCH, the PUCCH or the PRACH is not received or transmitted by the UE, or, when at least part of the transmission bandwidth of the PDSCH, the PUSCH, the PUCCH or the PRACH based on configuration is located outside of the BW3, the frequency domain resources outside of the BW3 are not mapped to by means of rate matching or puncturing.

Alternatively, the signal transmission unit may be further configured to determine the number of bits for frequency domain resource allocation bit field in the DCI for scheduling the PDSCH or the PUSCH according to the BW1, or, to determine the number of bits for frequency domain resource allocation bit field in the DCI for scheduling the PDSCH or the PUSCH and located in the UE-specific search space according to the BW1, and to determine the number of bits for frequency domain resource allocation bit field in the DCI located in the cell common search space according to the BWP bandwidth, or, to determine the number of bits for frequency domain resource allocation bit field in normal DCI for scheduling the PDSCH or the PUSCH according to the BW1, and to determine the number of bits for frequency domain resource allocation bit field in fallback DCI according to the BWP bandwidth, or, to determine the number of bits for frequency domain resource allocation bit field in the DCI for scheduling the PDSCH or the PUSCH and located in the UE-specific search space according to the BW1, and to determine the number of bits for frequency domain resource allocation bit field in the DCI located in the cell common search space according to the BW2, or, to determine the number of bits for frequency domain resource allocation bit field in the normal DCI for scheduling the PDSCH or the PUSCH according to the BW1, and to determine the number of bits for frequency domain resource allocation bit field in the fallback DCI according to the BW2.

Alternatively, the signal transmission unit may be further configured to determine a RBG (Resource Block Group) size according to the BW1 when the frequency domain resources of the PDSCH or the PUSCH are allocated based on the RBG, or, to determine a RBG size of the PDSCH or the PUSCH scheduled by DCI located in a UE-specific search space according to the BW1, and to determine a RBG size of the PDSCH or the PUSCH scheduled by DCI located in a common search space according to the BWP bandwidth, or, to determine a RBG size of the PDSCH or the PUSCH scheduled by normal DCI according to the BW1, and to determine a RBG size of the PDSCH or the PUSCH scheduled by fallback DCI according to the BWP bandwidth, or, to determine the RBG size of the PDSCH or the PUSCH scheduled by the DCI located in the UE-specific search space according to the BW1, and to determine the RBG size of the PDSCH or the PUSCH scheduled by the DCI located in the common search space according to the BW2, or, to determine the RBG size of the PDSCH or the PUSCH scheduled by the normal DCI according to the BW1, and to determine the RBG size of the PDSCH or the PUSCH scheduled by the fallback DCI according to the BW2 , or, to determine an interleaving depth according to the BW1 when the frequency domain resources of the PDSCH or the PUSCH are allocated based on interleaving, or, to determine an interleaving depth of the PDSCH or the PUSCH scheduled by the DCI located in the UE-specific search space according to the BW1, and to determine an interleaving depth of the PDSCH or the PUSCH scheduled by the DCI located in the common search space according to the BWP bandwidth, or, to determine an interleaving depth of the PDSCH or the PUSCH scheduled by the normal DCI according to the BW1 , and to determine an interleaving depth of the PDSCH or the PUSCH scheduled by the fallback DCI according to the BWP bandwidth, or, to determine the interleaving depth of the PDSCH or the PUSCH scheduled by the DCI located in the UE-specific search space according to the BW1, and to determine the interleaving depth of the PDSCH or the PUSCH scheduled by the DCI located in the common search space according to the BW2, or, to determine the interleaving depth of the PDSCH or the PUSCH scheduled by the normal DCI according to the BW1, and to determine the interleaving depth of the PDSCH or the PUSCH scheduled by the fallback DCI according to the BW2.

Alternatively, when at least part of the frequency domain resources in a group of PRBs are uplink resources, the group of PRBs is not configured as a CORESET frequency domain resource by the base station, or, when at least part of frequency domain resources in one PDCCH candidate are the uplink resources, UE does not monitor the one PDCCH candidate, or, when at least part of frequency domain resources in one PDCCH candidate are the uplink resources or flexible resources, the UE does not monitor the one PDCCH candidate.

According to an exemplary embodiment of the present disclosure, a computer readable storage medium stored with a computer program, when the computer program is executed by a processor, the signal transmission method for UE according to the present disclosure is implemented.

According to an exemplary embodiment of the present disclosure, there is provided a data transmission apparatus, including a processor, a memory stored with a computer program, wherein when the computer program is executed by a processor, the signal transmission method for UE according to the present disclosure is implemented.

Additional aspects and/or advantages of the present general inventive concept will be set forth in part in the description which follows, still a portion will be apparent from the description or may be learned by the implementation of the general concept of the present disclosure.

BRIEF DESCRIPTION OF DRAWINGS

The above and other objects and features of the exemplary embodiments of the present disclosure will become more apparent from the following description taken in conjunction with the accompanying drawings that exemplarily illustrates embodiments, in which.

MODE FOR THE INVENTION

Figure 1:
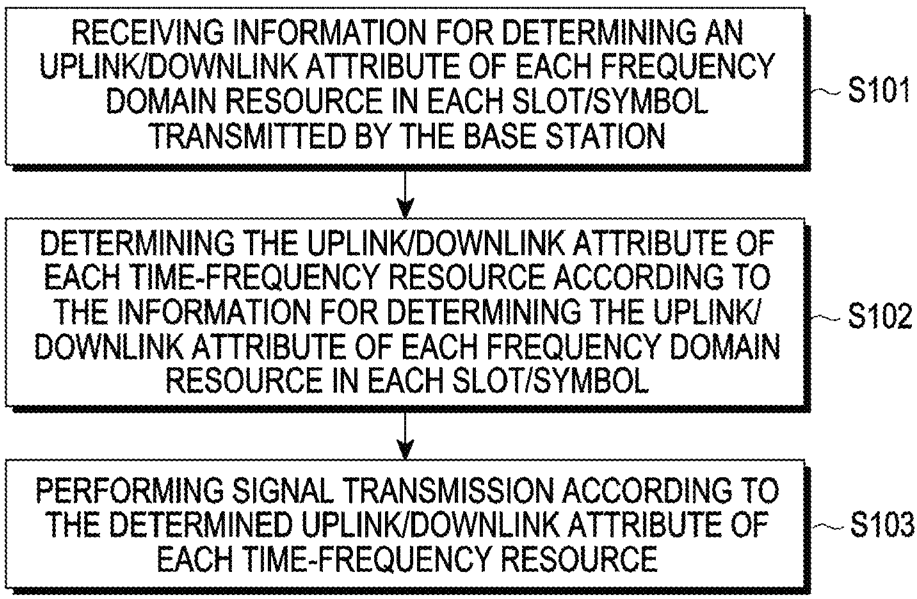
FIG. 1 illustrates a flowchart of a signal transmission method for UE according to an exemplary embodiment of the present disclosure.

Reference will now be made in detail to exemplary embodiments of the present disclosure, and examples of the embodiments are illustrated in the accompanying drawings, wherein same reference numerals refer to same parts throughout. The embodiments will be illustrated below, by referring to the accompanying drawings, so as to explain the present disclosure.

In prior art, the same symbol on one carrier only supports transmission in one direction (i.e., uplink transmission or the downlink transmission), so the base station only needs to indicate the uplink and downlink transmission direction in the time dimension. The base station may indicate UL/DL slot periodically, for example, indicate periodic slot configuration through higher-layer signaling, or indicate a slot format within a period of time through dynamic signaling. The uplink/downlink attribute (used for uplink transmission, used for downlink transmission, or used for flexible transmission) of each frequency domain resource in each slot/symbol is determined through the slot configuration/format. The flexible slot/symbol may either be used for uplink transmission or downlink transmission, but only for one direction at one time.

If there may be transmissions in different directions on different frequency domain resources of one symbol of one carrier, it is necessary to indicate the uplink/downlink attributes in both the time dimension and the frequency domain dimension. At the same time, considering that there are both lower version UEs which can only identify the uplink/downlink attribute in the time dimension and high version UEs which have the ability to identify the uplink/downlink attributes in both the time dimension and the frequency domain dimension on the same carrier. When the base station indicates the uplink/downlink attribute, or when the base station schedules the uplink and downlink transmission, it is necessary to ensure that the normal operation of the lower version UEs is not affected, and the transmission efficiency of the high version UEs is improved as much as possible.

How to indicate the uplink and downlink transmission resources on a carrier (also called indication of slot format) for a UE, and how to perform uplink and downlink transmission on such carrier, are urgent problems to be solved.

FIG. 1 illustrates a flowchart of a signal transmission method for UE according to an exemplary embodiment of the present disclosure.

Referring to FIG. 1, in step S101, information for determining an uplink/downlink attribute of each frequency domain resource in each slot/symbol transmitted by the base station is received.

In an exemplary embodiment of the present disclosure, the information for determining the uplink/downlink attribute of each frequency domain resource in each slot/symbol may include at least one of cell common UL/DL information, UE-specific UL/DL information, and dynamic UL/DL information.

In an exemplary embodiment of the present disclosure, the cell common UL/DL information may include a first type of cell common UL/DL information and/or a second type of cell common UL/DL information, the UE-specific UL/DL information may include a first type of UE-specific UL/DL information and/or second type of UE-specific UL/DL information, and the dynamic UL/DL information may include a first type of dynamic UL/DL information and/or a second type of dynamic UL/DL information.

In an exemplary embodiment of the present disclosure, the first type of cell common UL/DL information may include information on the uplink/downlink attribute in the time dimension. The first type of cell common UL/DL information may be used to indicate the period and which slots/symbols in the period are uplink slots/symbols, downlink slots/symbols, or flexible slots/symbols, and the indicated uplink/downlink attribute is applicable to all frequency domain resources in each slot/symbol of this cell, that is, all frequency domain resources within the bandwidth of this cell have the same uplink/downlink attribute in one slot/symbol. The second type of cell common UL/DL information may include information on the uplink/downlink attributes in both the time dimension and the frequency domain dimension, and the second type of cell common UL/DL information may be used to indicate which frequency domain resources of which slots/symbols are uplink transmission resources, downlink transmission resources or flexible transmission resources. Herein, the flexible transmission resources may be indicated explicitly or implicitly. For example, the signaling indicates which resources are flexible transmission resources, or the signaling only indicates which resources are uplink transmission resources or the downlink transmission resources, and the resources that are not indicated implicitly represent the flexible transmission resources. For example, if the bandwidth of one carrier includes 100 PRBs, wherein the 1st to 50th PRBs is indicated to be uplink and the 61st to 100th PRBs is indicated to be downlink, the 51st to 60th PRBs are considered to be flexible transmission resources. This indication method is also applicable to other UL/DL information in the present invention. For example, it is applicable to the second type of UE-specific UL/DL information, the second type of dynamic UL/DL information, and so on, and will not be described again.

Specifically, the base station may indicate the uplink/downlink attribute of each time-frequency resource through the first type of cell common UL/DL information or the second type of cell common UL/DL information.

Figures 2, 3A:
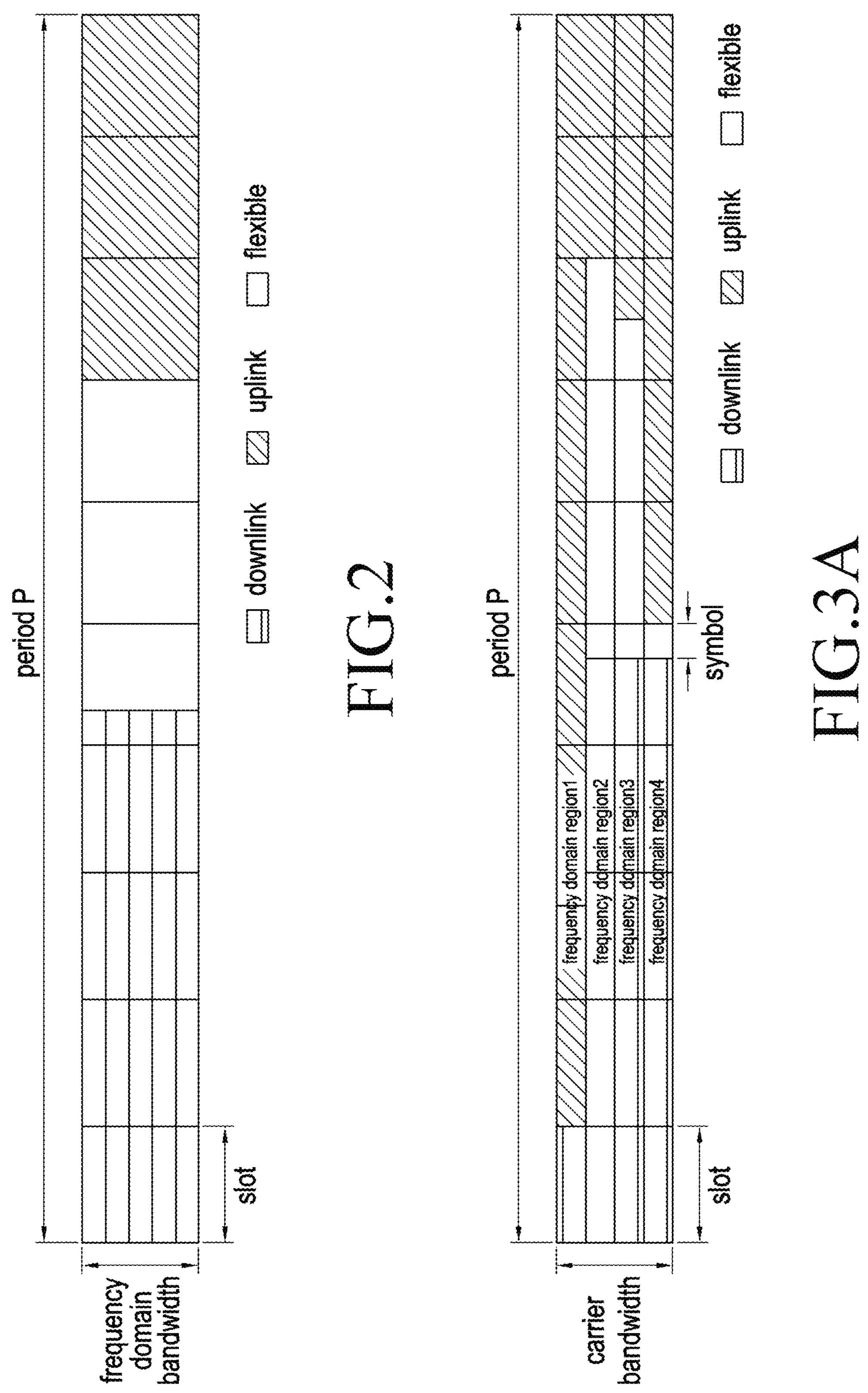
FIG. 2 illustrates the uplink/downlink attribute of the time-frequency resource indicated by a first type of cell common UL/DL information according to an exemplary embodiment of the present disclosure.
FIGS. 3*a*, 3*b* and 3*c* illustrate the uplink/downlink attribute of time-frequency resources indicated by a second type of cell common UL/DL information according to an exemplary embodiment of the present disclosure.

FIG. 2 illustrates the uplink/downlink attribute of time-frequency resources indicated by the first type of cell common UL/DL information according to an exemplary embodiment of the present disclosure. The first type of cell common UL/DL information only includes the information on the uplink/downlink attribute in the time dimension. As shown in FIG. 2, the cell common UL/DL information indicates the period P, and which slots/symbols in the period P separately are uplink slots/symbols, downlink slots/symbols or flexible slots/symbols and the uplink/downlink attributes of all frequency domain resources in the bandwidth of the cell within the slot/symbol are the same. Preferably, the first type of cell common UL/DL information may be common to each configured BWP, that is, the UL/DL information of each configured BWP is the same.

In an exemplary embodiment of the present disclosure, the second type of cell common UL/DL information may be used to indicate the uplink/downlink attribute of each frequency domain region in the carrier where the cell is located. Preferably, the number of the frequency domain regions is determined according to the bandwidth of the frequency domain resources. Alternatively, the second type of cell common UL/DL information may be used to indicate a starting point and continuous frequency domain resources of each frequency domain region, and indicate the uplink/downlink attribute of each frequency domain region. Alternatively, when a set of divisions and uplink/downlink attributes of the frequency domain regions are predefined, the second type of cell common UL/DL information may be used to indicate one of the set of divisions and the uplink/downlink attributes of the frequency domain regions. Alternatively, for different working frequency bands and/or bandwidths, the division and the uplink/downlink attribute of the frequency domain region may be defined separately.

Figures 3B, 3C:
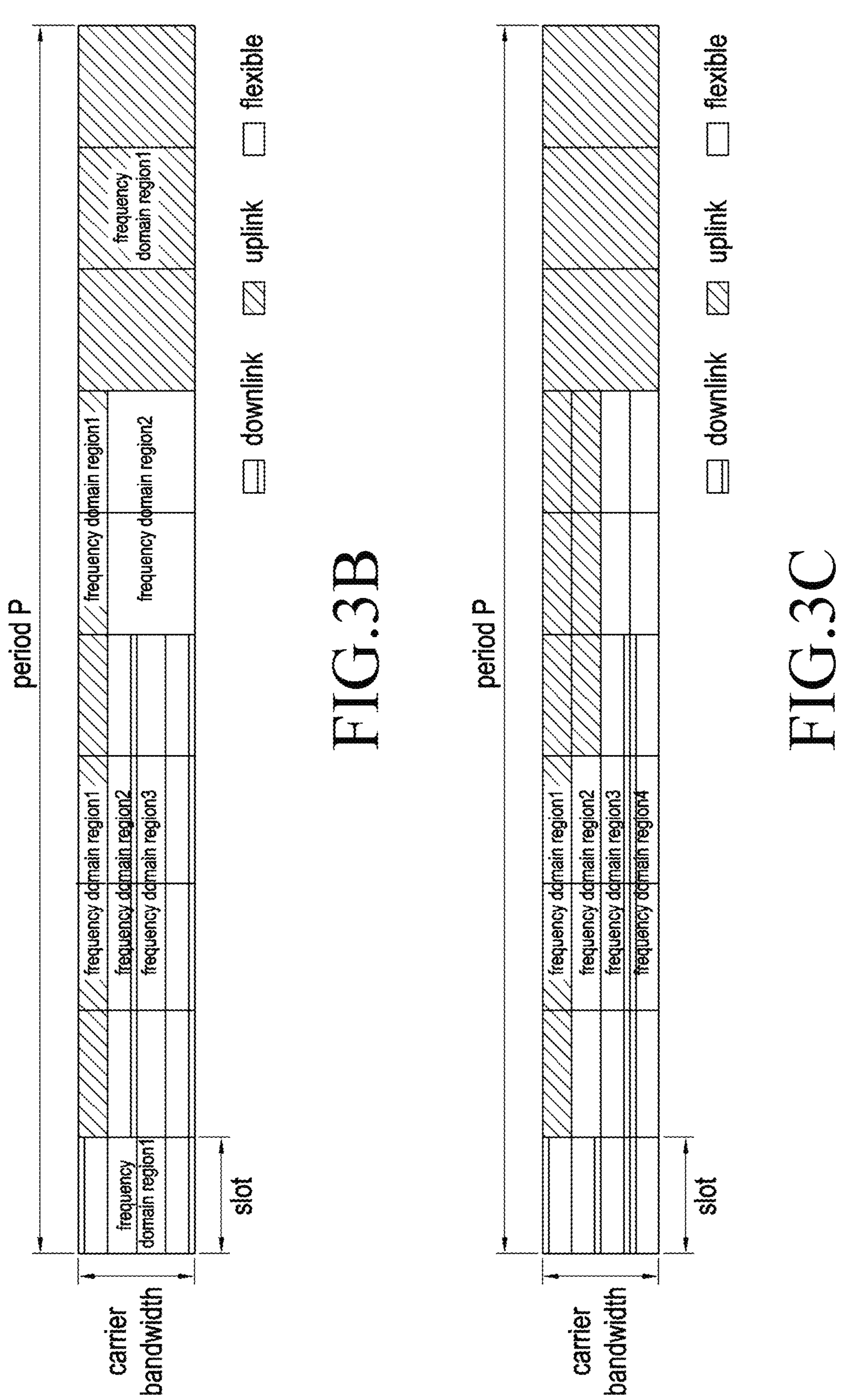

FIG. 3*a* to FIG. 3*c* illustrate a schematic diagram of a second type of cell common UL/DL information according to an exemplary embodiment of the present disclosure. The second type of cell common UL/DL information includes information on the uplink/downlink attributes in both the time dimension and in the frequency domain dimension, and may indicate which frequency domain resources of which slots/symbols are uplink transmission resources, downlink transmission resources or flexible transmission resources. It is not difficult to find from FIG. 3*a* to FIG. 3*c* that the uplink/downlink attributes of different frequency domain resources in the same slot/symbol may be different.

Preferably, the second type of cell common UL/DL information may indicate the uplink/downlink attribute of each frequency domain region in the carrier where the cell is located. The frequency domain resource in the carrier where the cell is located may be determined by the Subcarrier Spacing (SCS)-Specific Carrier Information Element (IE). The definition of SCS-Specific Carrier may be, for example, the following definition:

```
SCS-SpecificCarrier ::=                     SEQUENCE {
    offsetToCarrier                         INTEGER (0..2199),
    subcarrierSpacing                       SubcarrierSpacing,
    carrierBandwidth                        INTEGER
(1..maxNrofPhysicalResourceBlocks),
    ...,
}.
```

The frequency domain resource is divided into M frequency domain regions at a predefined granularity. The second type of cell common UL/DL information indicates the uplink/downlink attribute of the slot/symbol in each of the M frequency domain regions respectively. Preferably, the value of M is determined according to the bandwidth of the frequency domain resources. For example, when the range of the PRB number included in the carrier bandwidth is N0≤PRB number<N1, M takes the value M1, and when N1≤PRB number<N2, M takes the value M2. Preferably, the frequency domain resources may be divided into at most M frequency domain regions, and the base station indicates the starting point and continuous frequency domain resources of each frequency domain region, and indicates the uplink/downlink attribute of each frequency domain region. Preferably, the standard predefines a set of divisions and uplink/downlink attributes of the frequency domain regions, and the base station indicates one of the set of divisions and the uplink/downlink attributes of the frequency domain regions. Preferably, for different frequency bands and/or bandwidths, a set of divisions and uplink/downlink attributes of the frequency domain regions are defined separately.

According to one method described above, it is assumed that the carrier bandwidth in the carrier where the serving cell C is located is 106 PRBs, the Subcarrier Spacing (SCS) is 15 KHz, and the carrier is divided into M=4 frequency domain regions, wherein region 1 is the 1st to 27th PRBs, region 2 is the 28th to 54th PRBs, region 3 is the 55th to 80th PRBs, and region 4 is the 81st to 106th PRBs. The second type of cell common UL/DL information indicates the uplink/downlink attributes of the four frequency domain regions of each slot/symbol in the period P=10 ms respectively, as shown in FIG. 3*a*.

According to another manner described above, it is assumed that the carrier bandwidth in the carrier where the serving cell C is located is 100 MHz, and one slot/symbol can be divided into a maximum of M=3 frequency domain regions. The frequency domain resources of one slot/symbol may be all for downlink transmission, all for uplink transmission, or all for flexible transmission, or a part for uplink transmission plus a part for flexible transmission plus a part for downlink transmission, or a part for uplink transmission plus a part for downlink transmission. For example, in the second to fifth slots in FIG. 3*b*, frequency domain region 1 is for 10 MHz uplink transmission, frequency domain region 2 is for 10 MHz flexible transmission, and frequency domain region 3 is for 80 MHz downlink transmission.

Preferably, within the carrier bandwidth, the frequency domain resources with the same uplink/downlink attribute must be continuous in the frequency domain, and cannot be dispersed in discontinuous frequency domain regions, as shown in FIG. 3c. This may reduce the interference between signals in different transmission directions, or reduce the frequency domain resources reserved for reducing the interference, thereby improving the system transmission efficiency.

In an exemplary embodiment of the present disclosure, for one slot/symbol, there are no more than two types of uplink/downlink attribute for each frequency domain resource within one carrier bandwidth, or, for one slot/symbol, each frequency domain resource within the carrier bandwidth only supports a specific uplink/downlink attribute combination.

Specifically, for one slot/symbol, at most two different uplink/downlink attributes may be configured within the carrier bandwidth, for example, uplink transmission is in a part of the frequency domain regions, and downlink transmission is in another part of the frequency domain regions. Or, uplink transmission is in a part of the frequency domain regions, flexibly transmission is in another part of the frequency domain regions. Or, downlink transmission is in a part of the frequency domain regions, and flexible transmission is in another part of the frequency domain regions. Preferably, in order to more easily control the interference between the signals in different transmission directions, it may be specified that only certain specific uplink/downlink attribute combinations are supported. By controlling the configuration of different uplink/downlink attributes, the interference between signals in different transmission directions can be reduced, or the frequency domain resources reserved for reducing the interference can be reduced, thereby improving the system transmission efficiency.

In an exemplary embodiment of the present disclosure, in a specific slot/symbol, all frequency domain regions are configured with the same uplink/downlink attribute, or, in the specific slot/symbol, each frequency domain region is not configured with the conflicting uplink/downlink attributes (the uplink/downlink attribute of the uplink transmission is conflict to the uplink/downlink attribute of the downlink transmission, the uplink/downlink attribute of uplink/downlink transmission resources and the uplink/downlink attribute of flexible transmission resources are different but not conflicting), or, in the specific slot/symbol, specific frequency domain regions are configured with specific uplink/downlink attribute.

Specifically, in the specific slot/symbol, all frequency domain regions can only be configured with the same uplink/downlink attribute. For example, all frequency domain regions in a slot/symbol containing SS/PBCH (Synchronization Signals/Physical Broadcast Channels) Block or a slot/symbol containing CORESET 0 of Type-0 PDCCH CSS (Common Search Space) can only be configured to be downlink transmission, or all frequency domain regions in a slot/symbol containing the PRACH resource indicated by RACH-ConfigCommon can only be configured to be uplink transmission, or all frequency domain regions in a slot/symbol of an effective RACH Transmission Occasion (RO) can only be configured to be uplink transmission, or all frequency domain regions in a slot/symbol of an effective PUSCH Transmission Occasion (PO, for Msg A PUSCH) can only be configured to be uplink transmission.

Preferably, in the specific slot/symbol, different frequency domain regions cannot be configured with conflicting uplink/downlink attributes (the uplink transmission conflicts with the downlink transmission). For example, any one of the frequency domain regions in the slot/symbol containing the SS/PBCH Block, or the slot/symbol containing the Control Resource Set (CORESET) 0 of Type-0 PDCCH CSS cannot be configured to be uplink transmission, or any one of the frequency domain regions in the slot/symbol containing the Physical Random Access Channel (PRACH) resource indicated by the RACH-ConfigCommon cannot be configured to be downlink transmission, or any one of frequency domain regions in the slot/symbol of the effective RO cannot be configured to be downlink transmission, or any one of frequency domain regions in the slot/symbol of the effective PO cannot be configured to be downlink transmission. It is possible to protect signals with higher importance from the interference of transmission in conflicting directions on the same carrier by this limitation.

Preferably, in the specific slot/symbol, the specific frequency domain regions can only be configured with the specific uplink/downlink attribute. For example, the frequency domain region or the PRB where the SS/PBCH Block or the CORESET 0 of the Type-0 PDCCH CSS is located, or the PRB and a certain frequency domain guard band can only be configured to be downlink transmission; or, the frequency domain region or the PRB where the PRACH resource indicated by the RACH-ConfigCommon is located, or the PRB and a certain frequency domain guard band can only be configured to be downlink transmission; or, the frequency domain region or the PRB where the effective RO is located, or the PRB and a certain the frequency domain guard band can only be configured to be downlink transmission; or, the frequency domain region or the PRB where the valid PO is located, or the PRB and a certain frequency domain guard band can only be configured to be uplink transmission. By this limitation, it is possible to protect signals with higher importance from interference of transmission in conflicting directions on the same frequency domain resource, and to provide the flexibility of uplink and downlink transmission on other frequency domain resources.

In the exemplary embodiment of the present disclosure, when the received information for determining the uplink/downlink attribute of each frequency domain resource in each slot/symbol includes both of the first type of cell common UL/DL information and the second type of cell common UL/DL information, the uplink/downlink attribute of at least a part of the frequency domain regions in the downlink or uplink or flexible slots/symbols determined according to the first type of cell common UL/DL information may be overwritten by the second type of cell common UL/DL information.

In an exemplary embodiment of the present disclosure, when the received information for determining the uplink/downlink attribute of each frequency domain resource in each slot/symbol includes both of the first type of cell common UL/DL information and the second type of cell common UL/DL information, any one of the frequency domain regions in the downlink slots/symbols determined according to the first type of cell common UL/DL information cannot be configured to be the uplink transmission resource by the second type of cell common UL/DL information, or any one of the frequency domain regions in the uplink slot/symbol determined according to the first type of cell common UL/DL information cannot be configured to be downlink transmission resources by the second type of cell common UL/DL information.

In an exemplary embodiment of the present disclosure, when the received information for determining the uplink/downlink attribute of each frequency domain resource of each slot/symbol includes both of the first type of cell common UL/DL information and the second type of cell common UL/DL information, if it is determined according to the second type of cell common UL/DL information that the uplink/downlink attributes of all frequency domain regions of a certain slot/symbol are the same, the uplink/downlink attribute of the slot/symbol is the same as the uplink/downlink attribute of the slot/symbol determined by the first type of cell common UL/DL information. For example, if the second type of cell common UL/DL information indicates that all frequency domain resources of a slot/symbol are uplink transmission resources, this slot/symbol must also be indicated to be uplink transmission resources by the first type of cell common UL/DL information.

In an exemplary embodiment of the present disclosure, when the received information for determining the uplink/downlink attribute of each frequency domain resource of each slot/symbol includes both of the first type of cell common UL/DL information and the second type of cell common UL/DL information, if it is determined according to the second type of cell common UL/DL information that the uplink/downlink attributes of all frequency domain regions of a certain slot/symbol are the same, the uplink/downlink attribute of the slot/symbol cannot be conflicting to the uplink/downlink attribute of the slot/symbol determined by the first type of cell common UL/DL information. For example, if slot n is determined as uplink transmission resources according to the first type of cell common UL/DL information, the slot n may be determined to be uplink transmission resources or flexible transmission resources, but not downlink transmission resources according to the second type of cell common UL/DL information.

The base station may transmit only the first type of cell common UL/DL information, or only the second type of cell common UL/DL information, or both of the first type of cell common UL/DL information and the second type of cell common UL/DL information. Preferably, the first type of cell common UL/DL information and the second type of cell common UL/DL information are carried by different system information. For example, if there are both low-version UEs and high-version UEs in a cell, the base station may separately transmit two types of cell common UL/DL information. The low-version UEs determine the slot configuration according to the first type of cell common UL/DL information, and the high-version UEs determine the slot configuration according to the second type of cell common UL/DL information.

According to one manner, if the base station transmits both of the first type of cell common UL/DL information and the second type of cell common UL/DL information, at least one frequency domain region in downlink slots/symbols determined according to the first type of cell common UL/DL information can be configured to be any type of uplink/downlink attribute by the second type of cell common UL/DL information, at least one frequency domain region in uplink slots/symbols determined according to the first type of cell common UL/DL information can be configured to be any type of uplink/downlink attribute by the second type of cell common UL/DL information, and at least one frequency domain region in flexible slots/symbols determined according to the first type of cell common UL/DL information can be configured to be downlink slots/symbols, uplink slots/symbols or flexible slots/symbols by the second type of cell common UL/DL information.

According to another manner, if the base station transmits both of the first type of cell common UL/DL information and the second type of cell common UL/DL information, any one of the frequency domain regions in the downlink slots/symbols determined according to the first type of cell common UL/DL information cannot be configured to be uplink slots/symbols by the second type of cell common UL/DL information, or any one of the frequency domain regions in the uplink slots/symbols determined by the first type of cell common UL/DL information cannot be configured to be downlink slots/symbols by the second type of cell common UL/DL information, that is, the uplink/downlink attributes cannot be conflicting. These slots/symbols can be configured to be flexible slots/symbols by the second type of cell common UL/DL information.

According to yet another manner, if the base station transmits both of the first type of cell common UL/DL information and the second type of cell common UL/DL information, any one of frequency domain regions in the specific downlink slot/symbol determined according to the first type of cell common UL/DL information cannot be configured to be uplink slot/symbol by the second type of cell common UL/DL information, or any one of the frequency domain regions in the specific uplink slot/symbol determined according to the first type of cell common UL/DL information cannot be configured to be downlink slot/symbol by the second type of cell common UL/DL information, that is, the uplink/downlink attributes cannot be conflicting. The specific slot/symbol is determined according to a predefined rule, or indicated by the base station through signaling. For example, the specific slot/symbol is the first slot/symbol of period P.

According to yet another manner, if the base station transmits both of the first type of cell common UL/DL information and the second type of cell common UL/DL information, any one of the frequency domain regions in the specific downlink slot/symbol determined according to the first type of cell common UL/DL information cannot be configured to be uplink slot/symbol or flexible slot/symbol by the second type of cell common UL/DL information, or any one of the frequency domain regions in the specific uplink slot/symbol determined according to the first type of cell common UL/DL information cannot be configured to be downlink slot/symbol or flexible slot/symbol by the second type of cell common UL/DL information, that is, the uplink/downlink attributes cannot be different.

In an exemplary embodiment of the present disclosure, the first type of UE-specific UL/DL information may include information on the uplink/downlink attribute in the time dimension, the first type of UE-specific UL/DL information may be used to indicate the period and which slots/symbols in the period are separately uplink slots/symbols, downlink slots/symbols, or flexible slots/symbols, and the indicated uplink/downlink attribute is applicable to all frequency domain resources in each slot/symbol, that is, the uplink/downlink attributes of all frequency domain resources within one slot/symbol are the same. The second type of UE-specific UL/DL information may include information on the uplink/downlink attributes in both the time dimension and the frequency domain dimension, and the second type of UE-specific UL/DL information may be used to indicate which frequency domain resources of which slots/symbols are uplink slots/symbols, downlink slots/symbols, or flexible slots/symbols.

Specifically, the base station may indicate the uplink/downlink attribute of each time-frequency resource through the first type of UE-specific UL/DL information or the second type of UE-specific UL/DL information. The UE can not only determine the uplink/downlink attribute of each time-frequency resource of the serving cell through the cell common UL/DL information, but also determine the uplink/downlink attribute of each time-frequency resource of the serving cell or BWP through the UE-specific UL/DL information.

The first type of UE-specific UL/DL information only includes information on the uplink/downlink attribute in the time dimension, indicating which slots/symbols are separately uplink slots/symbols, downlink slots/symbols, or flexible slots/symbols, and the uplink/downlink attributes of all the frequency domain resources within one slot/symbol are the same. The first type of UE-specific UL/DL information is common to all configured BWPs, that is, the UL/DL information of all configured BWPs are same. The low-version UEs determine the slot configuration according to the first type of UE-specific UL/DL information.

The second type of UE-specific UL/DL information includes information on the uplink/downlink attributes in both the time dimension and the frequency domain dimension, indicating which frequency domain resources of which slots/symbols are the uplink transmission resources, the downlink transmission resources, or the flexible transmission resources. It is not difficult to find that the uplink/downlink attributes of different frequency domain resources in the same slot/symbol may be different.

In an exemplary embodiment of the present disclosure, the second type of UE-specific UL/DL information may be used to indicate the uplink/downlink attribute of each frequency domain region in the carrier where the serving cell is located.

Specifically, the second type of UE-specific UL/DL information indicates the uplink/downlink attribute of each frequency domain region in the carrier where one serving cell of the UE is located. The specific signaling design can refer to the second type of cell common UL/DL information, which will not be described again.

In an exemplary embodiment of the present disclosure, the second type of UE-specific UL/DL information may indicate the uplink/downlink attribute of each frequency domain region of each BWP. The second type of UE-specific UL/DL information of each BWP may be independently configured, so the uplink/downlink attributes of different BWPs are the same or different. The uplink/downlink attributes of all frequency domain resources in one BWP are the same, or the uplink/downlink attributes of different frequency domain resources in one BWP are the same or different. Preferably, the uplink/downlink attributes of different frequency domain resources in one BWP are the same or different, and the uplink/downlink attributes of different frequency domain resources cannot be conflicting.

Specifically, the second type of UE-specific UL/DL information may indicate the configured uplink/downlink attributes of the BWPs. The second type of UE-specific UL/DL information of different BWPs are independently configured. For example, when configuring a BWP for the UE, the base station configures the uplink/downlink attribute of each slot/symbol within this BWP for the UE. The uplink/downlink attributes of all frequency domain resources of one slot/symbol within this BWP are the same, that is, the second type of UE-specific UL/DL information only includes information in the time dimension, and does not include frequency domain dimension information with granularity finer than BWP bandwidth. It is not difficult to find that this method can control the uplink/downlink attribute of each BWP more flexibly, without being limited by the frequency domain regions of the carrier bandwidth. If the UE can only work on one BWP at a time, that is, there is only one active BWP, the UE finds that this BWP has only one uplink/downlink attribute in frequency domain. Therefore, this method makes it transparent to the UE that the different frequency domain resources in one carrier have the same or different uplink/downlink attribute. The UE implementation is simpler. For example, the UE only needs to set a filter bandwidth according to the bandwidth configuration of the BWP.

If the first type of cell common UL/DL information is received by the UE, and for a certain configured BWP, the UE-specific UL/DL information is not received, then the UE determines the uplink/downlink attribute of each frequency domain resource of each slot/symbol of this BWP according to the first type of cell common UL/DL information. If the second type of UE-specific UL/DL information is received by the UE, the UE determines the uplink/downlink attribute of each frequency domain resource of each slot/symbol of this BWP according to the second type of UE-specific UL/DL information and the first type of cell common UL/DL information, or only according to the second type of UE-specific UL/DL information.

Preferably, the second type of UE-specific UL/DL information can only overwrite the uplink/downlink attribute of each frequency domain resource of the specific slot/symbol indicated in the first type of cell common UL/DL information. For example, in the slots/symbols indicated as uplink or downlink by the first type of cell common UL/DL information, only at least part of the frequency domain resources in part of the specific slots/symbols may be overwritten to be downlink/flexible transmission or uplink/flexible transmission by the second type of UE-specific UL/DL information. The specific slots/symbols are determined according to the predefined rule, or indicated by the base station through signaling. By limiting that the specific slots/symbols cannot be overwritten, it is easier to achieve the coordination of the uplink transmission and downlink transmission between different transmitting nodes, and to avoid the interference between the uplink and the downlink affecting the reception and transmission of important signals.

Preferably, in a specific slot/symbol, all frequency domain regions can only be configured with the same uplink/downlink attribute. For example, all frequency domain regions in a slot/symbol containing the SS/PBCH Block or a slot/symbol containing the CORESET 0 of the Type-0 PDCCH CSS can only be configured to be downlink transmission, or all frequency domain regions in a slot/symbol containing the PRACH resource indicated by the RACH-ConfigCommon can only be configured to be uplink transmission.

Preferably, in the specific slot/symbol, different frequency domain regions cannot be configured with conflicting uplink/downlink attributes. For example, any one of the frequency domain regions in the slot/symbol containing the SS/PBCH Block, or the slot/symbol containing the CORESET 0 of the Type-0 PDCCH CSS cannot be configured to be uplink transmission, or any frequency domain region in the slot/symbol containing the PRACH resource indicated by the RACH-ConfigCommon cannot be configured to be downlink transmission.

Preferably, in the specific slot/symbol, a specific frequency domain region can only be configured to be a specific uplink/downlink attribute. For example, the frequency domain region or the PRB where the SS/PBCH Block or the CORESET 0 of the Type-0 PDCCH CSS is located, or the PRB and a certain frequency domain guard band can only be configured to be downlink transmission, or, the frequency domain region or the PRB where the PRACH resource indicated by the RACH-ConfigCommon is located, or the PRB and a certain frequency domain guard band can only be configured to be downlink transmission. By this limitation, it is possible to protect signals with higher importance from interference of transmission in the conflicting direction on the same frequency domain resource, and to provide the flexibility of uplink and downlink transmission on other frequency domain resources.

Preferably, the second type of UE-specific UL/DL information can only overwrite the uplink/downlink attribute of each frequency domain resources of the specific slot/symbol indicated in the second type of cell common UL/DL information. For example, according to the second type of cell common UL/DL information, if one slot/symbol includes only frequency domain resources of one uplink/downlink attribute, and the uplink/downlink attribute is flexible, the second type of UE-specific UL/DL information can overwrite this slot/symbol. For example, according to the second type of cell common UL/DL information, if one slot/symbol includes frequency domain resources of three types of uplink/downlink attributes (i.e., uplink/downlink/flexible), the second type of UE-specific UL/DL information cannot overwrite this slot/symbol.

In an exemplary embodiment of the present disclosure, the first type of dynamic UL/DL information may include information on the uplink/downlink attribute in the time dimension, and the first type of dynamic UL/DL information may be used to indicate which slots/symbols are uplink slots/symbols, downlink slots/symbols, or flexible slots/symbols, and the indicated uplink/downlink attribute is applicable to all frequency domain resources within each slot/symbol, that is, the uplink/downlink attributes of all frequency domain resources within one slot/symbol are the same. The second type of dynamic UL/DL information may include information on the uplink/downlink attributes in both the time dimension and the frequency domain dimension. The second type of dynamic UL/DL information may be used to indicate which frequency domain resources of which slots/symbols are the uplink transmission resources, the downlink transmission resources, or the flexible transmission resources.

Specifically, the UE can not only determine the uplink/downlink attribute of each frequency domain resource of each slot/symbol of the serving cell through the cell common UL/DL information, and/or determine the uplink/downlink attribute of each frequency domain resource of each slot/symbol of the serving cell or the BWP through the UE-specific UL/DL information, but also determine the uplink/downlink attribute of each frequency domain resource of each slot/symbol of the serving cell or the BWP through the UL/DL information dynamically transmitted by the base station.

The second type of dynamic UL/DL information includes information on the uplink/downlink attributes in both the time dimension and the frequency domain dimension, indicating which frequency domain resources of which slots/symbols are the uplink transmission resources, the downlink transmission resources, or the flexible transmission resources within a period of time. It is not difficult to find that the uplink/downlink attributes of different frequency domain resources in the same slot/symbol may be different.

In an exemplary embodiment of the present disclosure, the second type of dynamic UL/DL information may indicate the uplink/downlink attribute of each frequency domain region in the carrier where the serving cell is located.

Specifically, the second type of dynamic UL/DL information indicates the uplink/downlink attribute of each frequency domain region in the carrier where the serving cell is located. When the UE operates on one BWP, the uplink/downlink attribute of each slot/symbol of this BWP is determined according to the frequency domain resource location of this BWP and each frequency domain resource region of the carrier where the serving cell indicated by the second type of dynamic UL/DL information is located. Preferably, the uplink/downlink attributes of all frequency domain resources within one BWP are the same, and the uplink/downlink attributes of different BWPs are the same or different.

In an exemplary embodiment of the present disclosure, the second type of dynamic UL/DL information may indicate the uplink/downlink attribute of each frequency domain region of each BWP. The second type of dynamic UL/DL information of each BWP may be independently configured, so the uplink/downlink attributes of different BWPs are the same or different.

Specifically, the second type of dynamic UL/DL information indicates the uplink/downlink attributes of the BWPs, and the second type of dynamic UL/DL information indicates the uplink/downlink attribute at the granularity of BWP. Within one BWP, the uplink/downlink attributes of all frequency domain resources of one slot/symbol are the same, and the uplink/downlink attributes of different BWPs are the same or different. Within one BWP, the uplink/downlink attributes in all frequency domain resources of one slot/symbol are the same.

Preferably, the second type of dynamic UL/DL information indicates the uplink/downlink attribute of each frequency domain region of the BWPs. The uplink/downlink attributes of different frequency domain resources within one BWP are the same or different. Preferably, the uplink/downlink attributes of different frequency domain resources within one BWP cannot be conflicting. For example, each frequency domain resource includes uplink transmission and flexible transmission, or includes downlink transmission and flexible transmission, or only includes flexible transmission.

Preferably, the dynamic UL/DL information is common information for a UE group, that is, every UE in the same UE group reads the same dynamic UL/DL information. The base station may dynamically indicate UL/DL information through a MAC layer signaling (e.g., MAC CE) or a physical layer signaling (e.g., DCI). Preferably, one DCI can carry dynamic UL/DL information of one or more serving cells. For example, the second type of dynamic UL/DL information of different serving cells are independently determined. Each serving cell is divided into 4 frequency domain regions, and each frequency domain region has 8 bits to indicate the uplink/downlink attribute. One serving cell has a total of 32 bits. The second type of dynamic UL/DL information of a maximum of 4 such serving cells can be indicated in one DCI. Preferably, one DCI can carry the second type of dynamic UL/DL information of one or more BWPs. The second type of dynamic UL/DL information of different BWPs are independently determined. For example, when configuring this DCI, the base station configures the frequency domain resource of each BWP indicated in this DCI, and the bit position of the second type of dynamic UL/DL information of each BWP in the DCI.

Preferably, one DCI can carry the second type of dynamic UL/DL information of one or more frequency domain regions within one BWP.

In an exemplary embodiment of the present disclosure, both of the first type of cell common UL/DL information and the second type of cell common UL/DL information indicate the uplink/downlink attributes of the frequency domain regions in the symbols, and the indicated part of frequency domain regions have the same uplink/downlink attribute, or both of the first type of cell common UL/DL information and the second type of UE-specific UL/DL information indicate the uplink/downlink attributes of the frequency domain regions in the symbols, and the indicated part of frequency domain regions have the same uplink/downlink attribute, or, both of the first type of semi-static UL/DL information and the second type of dynamic UL/DL information indicate the uplink/downlink attributes of the frequency domain regions in the symbols, and the indicated part of frequency domain regions have the same uplink/downlink attribute. Herein, the first type of semi-static UL/DL information includes the first type of cell common UL/DL information and/or the first type of UE-specific UL/DL information. Herein, at least part of the frequency domain resources are configured by the base station or are predefined.

In an exemplary embodiment of the present disclosure, frequency domain resources of at least part of the symbols of the first type of transmission attribute determined according to the first type of cell common UL/DL information and/or the first type of UE-specific UL/DL information may be indicated by the second type of dynamic UL/DL information as the second type of transmission attribute resources. Herein, at least part of the symbols are configured by the base station or are predefined.

Specifically, the frequency domain resources of at least part of the downlink symbols determined according to the first type of cell common UL/DL information may be indicated by the second type of dynamic UL/DL information as uplink transmission resources or flexible transmission resources, and at least part of the downlink symbols are configured by the base station or are predefined. In the uplink symbols determined according to the first type of cell common UL/DL information, the frequency domain resources of at least part of the uplink symbols may be indicated by the second type of dynamic UL/DL information as downlink transmission resources or flexible transmission resources, and at least part of the downlink symbols are configured by the base station or are predefined. In the downlink symbols determined according to the first type of UE-specific UL/DL information, the frequency domain resources of at least part of the downlink symbols may be indicated by the second type of dynamic UL/DL information as uplink transmission resources or flexible transmission resources, and at least part of the downlink symbols are configured by the base station or are predefined.

In the uplink symbols determined according to the first type of UE-specific UL/DL information, the frequency domain resources of at least part of the uplink symbols may be indicated by the second type of dynamic UL/DL information as downlink transmission resources or flexible transmission resources, and at least part of the downlink symbols are configured by the base station or are predefined.

Preferably, the second type of transmission attribute cannot be conflicting to the first type of transmission attribute. For example, when the first type of transmission attribute is downlink, the second type of transmission attribute cannot be uplink.

In an exemplary embodiment of the present disclosure, the frequency domain resources of at least part of the symbols with the first type of transmission attribute determined according to the second type of cell common UL/DL information and/or the second type of UE-specific UL/DL information may be indicated by the second type of dynamic UL/DL information as second type of transmission attribute resources. Herein, at least part of the symbols are configured by the base station or are predefined. The specific method will not be described again.

In step S102, the uplink/downlink attribute of each time-frequency resource is determined according to the information for determining the uplink/downlink attribute of each frequency domain resource in each slot/symbol.

In an exemplary embodiment of the present disclosure, in determining the uplink/downlink attribute of each time-frequency resource, the uplink/downlink attribute of each time-frequency resource may be determined according to the second type of cell common UL/DL information or according to the first type of cell common UL/DL information and the second type of cell common UL/DL information, or, the uplink/downlink attribute of each frequency domain region of the carrier where the serving cell is located may be determined according to the second type of UE-specific UL/DL information and the first type of cell common UL/DL information, or, the uplink/downlink attribute of each frequency domain region of the carrier where the serving cell is located may be determined only according to the second type of UE-specific UL/DL information.

In an exemplary embodiment of the present disclosure, in determining the uplink/downlink attribute of each time-frequency resource, the uplink/downlink attribute of each slot/symbol of the BWP may be determined according to the frequency domain position of the BWP and each frequency domain region of the carrier where the serving cell is located. Herein, each frequency domain region of the carrier where the serving cell is located is indicated by at least one of the second type of cell common UL/DL information, the second type of UE-specific UL/DL information, and the second type of dynamic UL/DL information.

In an exemplary embodiment of the present disclosure, in determining the uplink/downlink attribute of each time-frequency resource, when the received information for determining the uplink/downlink attribute of each frequency domain resource in each slot/symbol includes one of the first type of cell common UL/DL information and the second type of cell common UL/DL information, the uplink/downlink attribute of each time-frequency resource may be determined according to the received cell common UL/DL information. When the received information for determining the uplink/downlink attribute of each frequency domain resource in each slot/symbol includes both of the first type of cell common UL/DL information and the second type of cell common UL/DL information, the uplink/downlink attribute of each time-frequency resource may be determined according to the second type of cell common UL/DL information, or the uplink/downlink attribute of each time-frequency resource may be determined according to the first type of cell common UL/DL information and the second type of cell common UL/DL information.

In an exemplary embodiment of the present disclosure, in determining the uplink/downlink attribute of each time-frequency resource, when the received information for determining the uplink/downlink attribute of each frequency domain resource in each slot/symbol includes the first type of cell common UL/DL information and does not includes the UE-specific UL/DL information, the uplink/downlink attribute of each BWP of this serving cell is determined by the UE according to the first type of cell common UL/DL information, wherein the uplink/downlink attribute is common to each configured BWP. When the received information for determining the uplink/downlink attribute of each frequency domain resource in each slot/symbol includes the first type of cell common UL/DL information and the second type of cell common UL/DL information, the uplink/downlink attribute of each frequency domain region in the carrier where the serving cell is located is determined according to the first type of cell common UL/DL information and the second type of cell common UL/DL information, or the uplink/downlink attribute of each frequency domain region in the carrier where the serving cell is located is determined only according to the second type of cell common UL/DL information. Preferably, the UE may determine the uplink/downlink attribute of the time-frequency resources of the BWP through the BWP configuration and the uplink/downlink attribute of each frequency domain region in the carrier where the serving cell is located. Preferably, the UE may determine the uplink/downlink attribute of the time-frequency resources of the BWP through the indicated uplink/downlink attribute of the time-frequency resources of the BWP.

Figures 4A, 4B:
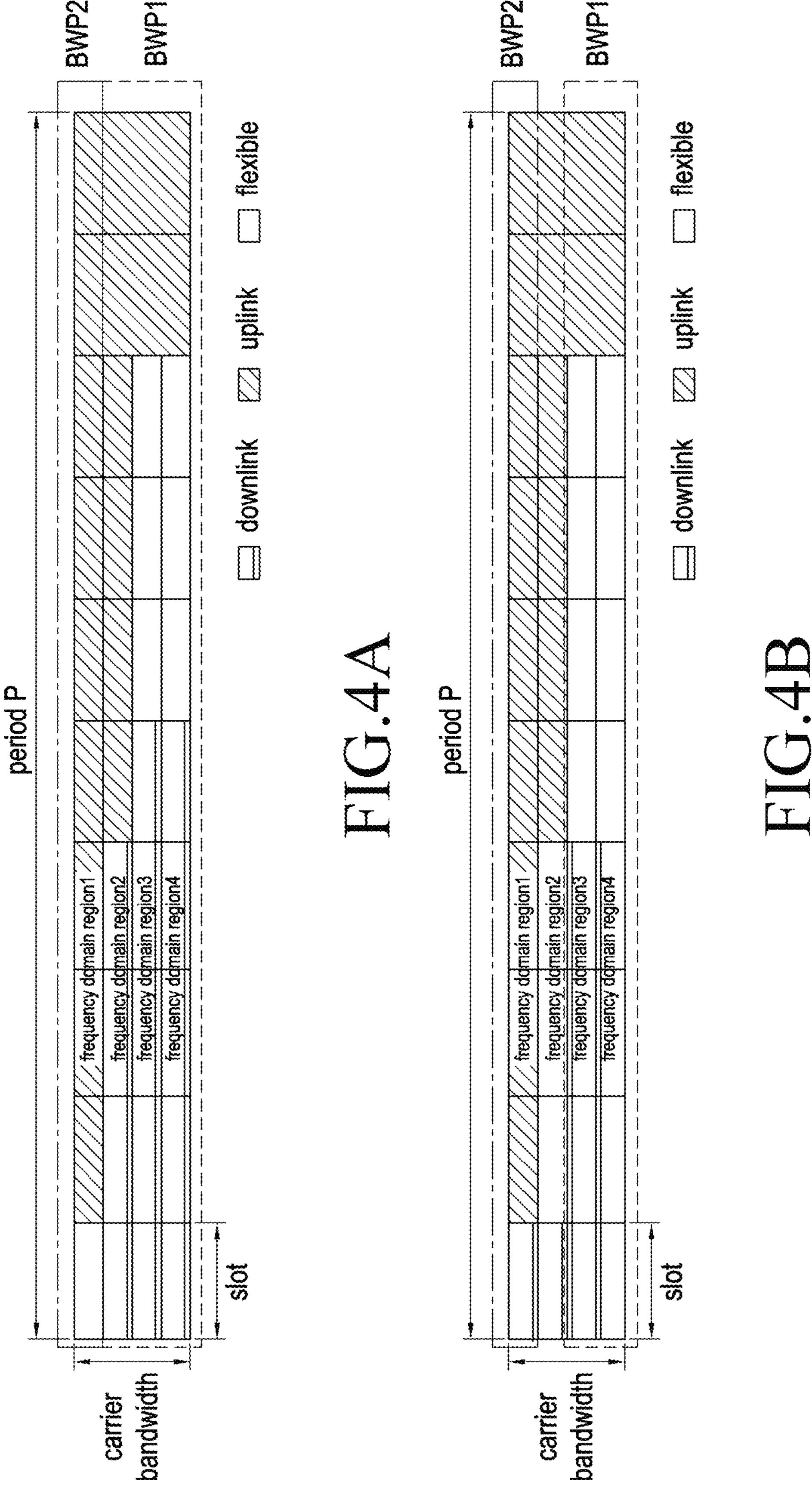
FIGS. 4*a* and 4*b* illustrate the uplink/downlink attributes of time-frequency resources indicated by the second type of UE-specific UL/DL information according to an exemplary embodiment of the present disclosure.

FIG. 4*a* and FIG. 4*b* illustrate the uplink/downlink attributes of time-frequency resources indicated by the second type of UE-specific UL/DL information. The UE may determine the uplink/downlink attribute of each slots/symbol of each BWP according to the configured frequency domain resource location of the BWP and each frequency domain resource region of the carrier where the serving cell indicated by the second type of UE-specific UL/DL information is located. As shown in FIG. 4*a*, the second type of UE-specific UL/DL information indicates the uplink/downlink attributes of four frequency domain regions on one carrier. The base station configures two BWPs on the carrier for the UE, wherein BWP1 corresponds to carrier regions 2~4, BWP2 corresponds to carrier region 1. In the BWP1, the uplink/downlink attributes of different frequency domain regions within one slot/symbol may be the same or different. In order to simplify the operation of interference suppression, it can be specified that all frequency domain resources in one BWP have the same uplink/downlink attribute, or all frequency domain resources in one BWP cannot include the conflicting uplink/downlink attributes, for example, including uplink transmission and flexible transmission, or including downlink transmission and flexible transmission, or only flexible transmission. As shown in FIG. 4*b*, the second type of UE-specific UL/DL information indicates the uplink/downlink attributes of four frequency domain regions on one carrier. The base station configures two BWPs for the UE on this carrier, wherein the BWP1 corresponds to carrier regions 3 and 4, the BWP2 corresponds to carrier region 1. For the same slot, the uplink/downlink attributes of the BWP1 and the BWP2 are the same or different, but the uplink/downlink attributes of all frequency domain resources within one BWP bandwidth are the same.

In an exemplary embodiment of the present disclosure, the UE can not only determine the uplink/downlink attribute of each frequency domain resource of each slot/symbol of the serving cell through the cell common UL/DL information, and/or determine the uplink/downlink attribute of each frequency domain resource of each slot/symbol of the serving cell or the BWPs through the UE-specific UL/DL information, and may also determine the uplink/downlink attribute of each frequency domain resource of each slot/symbol of the serving cell or the BWPs through the UL/DL information dynamically transmitted by the base station.

Figures 5, 6:
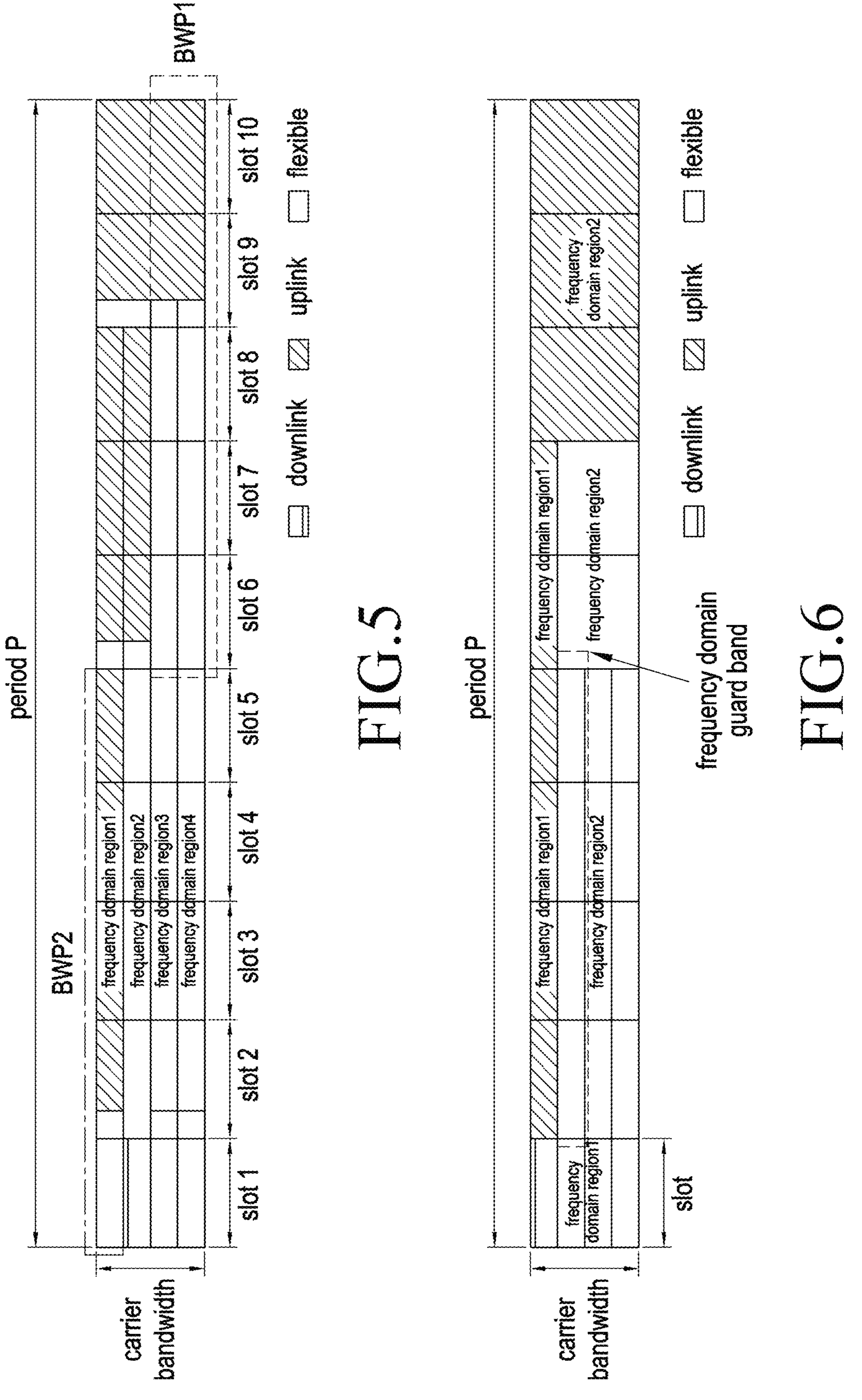
FIG. 5 illustrates that the uplink/downlink attributes of four frequency domain regions of one carrier are indicated in one DCI according to an exemplary embodiment of the present disclosure.
FIG. 6 illustrates a schematic diagram of a guard band on a frequency domain reserved between frequency domain resources according to an exemplary embodiment of the present disclosure.

Specifically, in determining the uplink/downlink attribute of each time-frequency resource, the uplink/downlink attribute of each slot/symbol of the BWP may be determined according to the frequency domain position of the BWP and each frequency domain region of the carrier where the serving cell is located indicated by the second type of dynamic UL/DL information. Herein, each frequency domain region in the carrier where the serving cell is located is indicated by the second type of UE-specific UL/DL information or the second type of dynamic UL/DL information. FIG. 5 illustrates that the uplink/downlink attributes of 4 frequency domain regions of one carrier is indicated in one DCI according to an exemplary embodiment of the present disclosure. As shown in FIG. 5, the uplink/downlink attributes of four frequency domain regions of one carrier is indicated in one DCI. It is assumed that a UE is scheduled to operates on the BWP2 in slots 1~5, and is scheduled to operates on the BWP1 in slots 6~10, the UE can determine the uplink/downlink attributes of the BWP1 and the BWP2 according to the uplink/downlink attributes of the four frequency domain regions indicated by the DCI. Alternatively, the uplink/downlink attribute of each BWP is determined according to the second type of dynamic UL/DL information indicating the uplink/downlink attribute at the granularity of BWP. Alternatively, the uplink/downlink attribute of each frequency domain resource in each BWP is determined according to the second type of dynamic UL/DL information indicating the uplink/downlink attribute at the granularity of one frequency domain resource within a BWP.

In step S103, signal transmission is performed according to the determined uplink/downlink attribute of each time-frequency resource.

The uplink/downlink attributes of the time-frequency resources indicated by the base station and the actual uplink and downlink signal transmission need to meet a predefined relationship.

In an exemplary embodiment of the present disclosure, in the downlink transmission resources determined according to the second type of dynamic UL/DL information, the UE cannot perform uplink transmission. In the uplink transmission resources determined according to the second type of dynamic UL/DL information, the base station cannot perform downlink transmission.

If the UE is configured to receive the second type of dynamic UL/DL information, for a piece of time-frequency resource that are semi-statically configured to be flexible resource, if the second type of dynamic UL/DL information indicating the information of this piece of time-frequency resource is not received by the UE, the UE cannot perform transmission or reception based on higher layer configuration on this piece of time-frequency resource.

Considering that the flexibility of semi-static UL/DL information is lower than that of a real-time dynamic scheduling, and when the semi-static UL/DL information can only indicate the slot format in the time dimension (the first type of cell common UL/DL information or the first type of UE-specific UL/DL information), the flexibility of resource allocation is further reduced, it is necessary to allow the uplink/downlink attributes indicated by the semi-static UL/DL information to be different from the actual uplink and downlink transmission directions in some special cases.

In an exemplary embodiment of the present disclosure, in a part or all of the frequency domain resources of the downlink symbols determined according to the first type of UE-specific UL/DL information or specific downlink symbols thereof, the UE may perform a specific type of uplink transmission, the part or all of the frequency domain resources are configured by the base station or are predefined by the standard. The specific type of uplink transmission is a PRACH based on dynamic scheduling, a PUCCH based on dynamic scheduling, or a specific PUSCH, such as a PUSCH carrying URLLC services. Preferably, the specific PUSCH is based on scheduling or based on high-level configuration.

In an exemplary embodiment of the present disclosure, in a part or all of the frequency domain resources of the uplink symbols determined according to the first type of UE-specific UL/DL information or specific uplink symbols thereof, the UE may perform a specific type of downlink reception, the part or all of the frequency domain resources are configured by the base station or are predefined by the standard, and the specific type of downlink transmission is a specific PDSCH, such as a PDSCH carrying URLLC services, or a specific type of PDCCH.

In an exemplary embodiment of the present disclosure, if within one BWP, for one slot/symbol, a part of the frequency domain resources are uplink and the other part of the frequency domain resources are downlink, and the UE is configured to perform one of the downlink reception and the uplink transmission, the UE performs downlink reception or the uplink transmission according to the configuration. For example, in slot n, within the BWPs, the 1st to 70th PRBs are downlink, and the 81st to 100th PRBs are uplink. If in slot n, there is PUSCH transmission based on configuration, and no dynamic scheduling information is received by the UE, the UE transmits the configured PUSCH.

In an exemplary embodiment of the present disclosure, if within one BWP, for one slot/symbol, a part of the frequency domain resources are uplink and the other part of the frequency domain resources are downlink, and the UE is configured to perform both of the downlink reception (e.g., the PDCCH, the PDSCH, and the CSI-RS, etc.) and the uplink transmission (e.g., the PRACH, the PUCCH, the PUSCH, and the SRS, etc.), the UE determines signals with the highest priority for the downlink reception or the uplink transmission according to the predefined rules. The UE cannot perform transmission and reception at the same time.

Preferably, the predefined rules are at least one of the following:

- a priority of the PDCCH>a priority of the PUSCH/PUCCH/PRACH/SRS
- the priority of the PRACH>the priority of the PDCCH>the priority of the PUSCH/PUCCH/SRS
- the priority of the PRACH/PUCCH carrying HARQ-ACK>the priority of the PDCCH>the priority of the PUSCH/PUCCH/SRS carrying other UCI
- a priority of a specific type of PDCCH>the priority of the PRACH>the priority of other types of PDCCH>the priority of the PUSCH/PUCCH/SRS
- a priority of a specific type of PRACH/PUCCH/PUSCH>the priority of the PDCCH
- the priority of the specific type of PDCCH>the priority of the specific type of PRACH In an exemplary embodiment of the present disclosure, if within one BWP, for one slot/symbol, a part of the frequency domain resources are uplink and the other part of the frequency domain resources are downlink, the UE is configured to perform only one of the downlink reception and the uplink transmission, that is, it cannot be configured to have both downlink reception signals and uplink transmission signals.

In an exemplary embodiment of the present disclosure, if within one BWP, for one slot/symbol, a part of the frequency domain resources are uplink and the other part of the frequency domain resources are downlink, the UE determines to perform the downlink reception or the uplink transmission in this slot/symbol according to the dynamic scheduling. For example, in slot n, in the BWPs, the 1st to 70th PRBs are downlink, and the 81st to 100th PRBs are uplink. If there is a PUSCH transmission based on the configuration in slot n, and the downlink DCI schedule to receive the PDSCH in this slot is received by the UE, the UE receives the PDSCH and does not transmit the PUSCH.

In an exemplary embodiment of the present disclosure, if within one BWP, a part of the frequency domain resources may be uplink and the other part of the frequency domain resources may be downlink, the UE may determine the frequency domain resource parameters used for the downlink transmission or the uplink transmission only according to the frequency domain resources in the same direction or the non-conflicting frequency domain resources (including the flexible transmission part). In this manner, signaling overhead can be saved, or more efficient allocation for the frequency domain resources can be supported.

In an exemplary embodiment of the present disclosure, in performing signal transmission according to the determined uplink/downlink attribute of each time-frequency resource, the frequency domain resource parameters for downlink or the uplink transmission is determined according to a first bandwidth BW1, when a bandwidth for downlink transmission, or a bandwidth for uplink transmission, or both the bandwidth for downlink transmission and a bandwidth for flexible transmission, or both the bandwidth for uplink transmission and the bandwidth for flexible transmission within the BWP bandwidth determined according to the second type of UE-specific UL/DL information is the BW1; the frequency domain resource parameters for downlink or the uplink transmission is determined according to a second bandwidth BW2, when the bandwidth for downlink transmission, or the bandwidth for uplink transmission, or the bandwidth for downlink transmission and flexible transmission, or the bandwidth for uplink transmission and flexible transmission within the BWP bandwidth determined according to the second type of cell common UL/DL information is the BW2; the frequency domain resource parameters for downlink or the uplink transmission is determined according to a third bandwidth BW3, when the bandwidth for downlink transmission, or the bandwidth for uplink transmission, or the bandwidth for downlink transmission and flexible transmission, or the bandwidth for uplink transmission and flexible transmission within the BWP bandwidth determined according to the second type of dynamic UL/DL information is the BW3 . The frequency domain resources allocated by the base station for the PDSCH or the PUSCH are limited to the BW1, or the frequency domain resources allocated by the base station for the PDSCH or the PUSCH are limited to the BW2.

In an exemplary embodiment of the present disclosure, in determining the frequency domain resource parameters for downlink transmission or uplink transmission, the number of bits for frequency domain resource allocation bit field in the DCI for scheduling the PDSCH or the PUSCH may be determined according to the BW1.

In an exemplary embodiment of the present disclosure, in determining the frequency domain resource parameters for the downlink or the uplink transmission, the number of bits for frequency domain resource allocation bit field in the DCI for scheduling the PDSCH or the PUSCH and located in the UE-specific search space may be determined according to the BW1, and the number of bits for frequency domain resource allocation bit field in the DCI located in the cell common search space may be determined according to the BWP bandwidth.

In an exemplary embodiment of the present disclosure, in determining the frequency domain resource parameters for downlink transmission or uplink transmission, the number of bits for frequency domain resource allocation bit field in normal DCI for scheduling the PDSCH or the PUSCH may be determined according to the BW1, and the number of bits for frequency domain resource allocation bit field in fallback DCI may be determined according to the BWP bandwidth.

In an exemplary embodiment of the present disclosure, in determining the frequency domain resource parameters for the downlink or the uplink transmission, the number of bits for frequency domain resource allocation bit field in the DCI for scheduling the PDSCH or the PUSCH and located in the UE-specific search space may be determined according to the BW1, and the number of bits for frequency domain resource allocation bit field in the DCI located in the cell common search space may be determined according to the BW2.

In an exemplary embodiment of the present disclosure, in determining the frequency domain resource parameters for downlink transmission or uplink transmission, the number of bits for frequency domain resource allocation bit field in the normal DCI for scheduling the PDSCH or the PUSCH may be determined according to the BW1, and the number of bits for frequency domain resource allocation bit field in the fallback DCI may be determined according to the BW2 .

In an exemplary embodiment of the present disclosure, in determining the frequency domain resource parameters for downlink transmission or uplink transmission, a Resource Block Group (RBG) size may be determined according to the BW1 when the frequency domain resources of the PDSCH or the PUSCH are allocated based on the RBG.

In an exemplary embodiment of the present disclosure, in determining the frequency domain resource parameters for downlink transmission or uplink transmission, a RBG size of the PDSCH or the PUSCH scheduled by the DCI located in the UE-specific search space may be determined according to the BW1, and a RBG size of the PDSCH or the PUSCH scheduled by the DCI located in the common search space may be determined according to the BWP bandwidth.

In an exemplary embodiment of the present disclosure, in determining the frequency domain resource parameters for downlink transmission or uplink transmission, a RBG size of the PDSCH or the PUSCH scheduled by the normal DCI may be determined according to the BW1, and a RBG size of the PDSCH or the PUSCH scheduled by the fallback DCI may be determined according to the BWP bandwidth.

In an exemplary embodiment of the present disclosure, in determining the frequency domain resource parameters for downlink transmission or uplink transmission, the RBG size of the PDSCH or the PUSCH scheduled by the DCI located in the UE-specific search space may be determined according to the BW1, and the RBG size of the PDSCH or the PUSCH scheduled by the DCI located in the common search space may be determined according to the BW2.

In an exemplary embodiment of the present disclosure, in determining the frequency domain resource parameters for downlink transmission or uplink transmission, the RBG size of the PDSCH or the PUSCH scheduled by the normal DCI may be determined according to the BW1, and the RBG size of the PDSCH or the PUSCH scheduled by the fallback DCI may be determined according to the BW2.

In an exemplary embodiment of the present disclosure, in determining the frequency domain resource parameters for downlink transmission or uplink transmission, an interleaving depth may be determined according to the BW1 when the frequency domain resources of the PDSCH or the PUSCH are allocated based on interleaving.

In an exemplary embodiment of the present disclosure, in determining the frequency domain resource parameters for downlink transmission or uplink transmission, an interleaving depth of the PDSCH or the PUSCH scheduled by the DCI located in the UE-specific search space may be determined according to the BW1, and an interleaving depth of the PDSCH or the PUSCH scheduled by the DCI located in the common search space may be determined according to the BWP bandwidth.

In an exemplary embodiment of the present disclosure, in determining the frequency domain resource parameters for downlink transmission or uplink transmission, an interleaving depth of the PDSCH or the PUSCH scheduled by the normal DCI may be determined according to the BW1, and an interleaving depth of the PDSCH or the PUSCH scheduled by the fallback DCI may be determined according to the BWP bandwidth.

In an exemplary embodiment of the present disclosure, in determining the frequency domain resource parameters for downlink transmission or uplink transmission, the interleaving depth of the PDSCH or the PUSCH scheduled by the DCI located in the UE-specific search space may be determined according to the BW1, and the interleaving depth of the PDSCH or the PUSCH scheduled by the DCI located in the common search space may be determined according to the BW2.

In an exemplary embodiment of the present disclosure, in determining the frequency domain resource parameters for downlink transmission or uplink transmission, the interleaving depth of the PDSCH or the PUSCH scheduled by the normal DCI may be determined according to the BW1, and interleaving depth of the PDSCH or the PUSCH scheduled by the fallback DCI may be determined according to the BW2.

In an exemplary embodiment of the present disclosure, in determining the frequency domain resource parameters for downlink transmission or uplink transmission, when the base station configures the transmission bandwidth for Channel State Information-Reference Signal (CSI-RS) or Sounding Reference Signal (SRS), a bandwidth of the configured CSI-RS or the configured SRS is limited within the BW1.

In an exemplary embodiment of the present disclosure, in determining the frequency domain resource parameters for downlink transmission or uplink transmission, when at least part of the transmission bandwidth of the CSI-RS or the SRS is located outside of the BW1, the CSI-RS outside of the BW1 is not received by the UE, or the SRS outside of the BW1 is not transmitted by the UE.

In an exemplary embodiment of the present disclosure, in determining the frequency domain resource parameters for downlink transmission or uplink transmission, when at least part of the transmission bandwidth of the CSI-RS or the SRS based on configuration is located outside of the BW3, the CSI-RS outside of the BW3 is not received by the UE, or the SRS outside of the BW3 is not transmitted by the UE, or the CSI-RS is not received by the UE, or the SRS is not transmitted by the UE.

In an exemplary embodiment of the present disclosure, in determining the frequency domain resource parameters for downlink transmission or uplink transmission, when at least part of the transmission bandwidth of the PDSCH, the PUSCH, the PUCCH or the PRACH based on configuration is located outside of the BW3, the PDSCH, the PUSCH, the PUCCH or the PRACH outside of the BW3 is not received or transmitted by the UE, or, the PDSCH, the PUSCH, the PUCCH or the PRACH is not received or transmitted by the UE.

In an exemplary embodiment of the present disclosure, in determining the frequency domain resource parameters for downlink transmission or uplink transmission, when at least part of the transmission bandwidth of the PDSCH, the PUSCH, the PUCCH or the PRACH based on configuration is located outside of the BW3, the frequency domain resources outside of the BW3 are not mapped to by the UE.

Specifically, it is assumed that the downlink bandwidth or the uplink bandwidth within the BWP bandwidth determined according to the second type of UE-specific UL/DL information, or the bandwidth of (the downlink transmission plus the flexible transmission), or the bandwidth of (the uplink transmission plus the flexible transmission) is the BW1, the downlink bandwidth or the uplink bandwidth within the BWP bandwidth determined according to the second type of cell common UL/DL information, or the bandwidth of (the downlink transmission plus the flexible transmission), or the bandwidth of (the uplink transmission plus the flexible transmission) is the BW2 . The frequency domain resource parameters of the downlink transmission or the uplink transmission are determined according to the BW1 and/or the BW2.

Preferably, the frequency domain resources allocated by the base station for the PDSCH or the PUSCH may be limited within the BW1.

Preferably, the frequency domain resources allocated by the base station for the PDSCH or the PUSCH may be limited within the BW2. Preferably, if the PDSCH or the PUSCH supports frequency domain resource mapping based on frequency hopping, the starting point of the PRB after the frequency hopping is (RBstart+RBoffset) mod BW1, wherein the RBstart is the starting point of the frequency domain resource of the PDSCH or the PUSCH indicated by the base station, the RBoffset is the indicated offset of frequency hopping, mod means modulo.

Preferably, the starting point of the PRB after the frequency hopping is (RBstart+RBoffset) mod BW2. The method differs from the previous method in that regardless of whether the second type of UE-specific UL/DL information is received by the UE, the starting point of the PRB after the frequency hopping is determined only according to the BW2 determined by the second type of cell common UL/DL information. In this manner, it may avoid the problem that the frequency hopping resources of different UEs may collide due to the difference in the second type of cell common UL/DL information of different UEs.

Preferably, the number of bits for frequency domain resource allocation bit field in the DCI for scheduling the PDSCH or the PUSCH is determined according to the BW1. Preferably, the number of bits for frequency domain resource allocation bit field in the DCI located in different search spaces is determined according to different bandwidths. Specifically, the number of bits for frequency domain resource allocation bit field in the DCI for scheduling the PDSCH or the PUSCH and located in the UE-specific search space is determined according to the BW1, and the number of bits for frequency domain resource allocation bit field in the DCI located in the cell common search space is determined according to the BWP bandwidth. Alternatively, the number of bits for frequency domain resource allocation bit field in the DCI for scheduling the PDSCH or the PUSCH and located in the UE-specific search space is determined according to the BW1, and the number of bits for frequency domain resource allocation bit field in the DCI located in the cell common search space is determined according to the BW2.

Preferably, the number of bits for frequency domain resource allocation bit field in different types of DCI is determined according to different bandwidths. Specifically, the number of bits for frequency domain resource allocation bit field in normal DCI for scheduling the PDSCH or the PUSCH is determined according to the BW1, and the number of bits for frequency domain resource allocation bit field in fallback DCI is determined according to the BWP bandwidth. Alternatively, the number of bits for frequency domain resource allocation bit field in the normal DCI for scheduling the PDSCH or the PUSCH is determined according to the BW1, and the number of bits for frequency domain resource allocation bit field in the fallback DCI is determined according to the BW2.

Preferably, if the frequency domain resource allocation of the PDSCH or the PUSCH is based on the Resource Block Group (RBG), the RBG size is determined according to the BW1 . Preferably, the RBG sizes of the PDSCH or the PUSCH scheduled by the DCI in different search spaces are determined according to different bandwidths. Specifically, the RBG size of the PDSCH or the PUSCH scheduled by the DCI located in the UE-specific search space is determined according to the BW1, and the RBG size of the PDSCH or the PUSCH scheduled by the DCI located in the common search space is determined according to the BWP bandwidth. Alternatively, the RBG size of the PDSCH or the PUSCH scheduled by the DCI located in the UE-specific search space is determined according to the BW1, and the RBG size of the PDSCH or the PUSCH scheduled by the DCI located in the common search space is determined according to the BW2.

Preferably, the RBG sizes of the PDSCH or the PUSCH scheduled by different types of DCI are determined according to different bandwidths. Specifically, the RBG size of the PDSCH or the PUSCH scheduled by the normal DCI is determined according to the BW1, and the RBG size of the PDSCH or the PUSCH scheduled by the fallback DCI is determined according to the BWP bandwidth. Alternatively, the RBG size of the PDSCH or the PUSCH scheduled by the normal DCI is determined according to the BW1, and the RBG size of the PDSCH or the PUSCH scheduled by the fallback DCI is determined according to the BW2.

Preferably, if the frequency domain resource allocation of the PDSCH or the PUSCH is based on interleaving, the interleaving depth is determined according to the BW1 . Preferably, the interleaving depths of the PDSCHs or the PUSCHs scheduled by the DCI in different search spaces are determined according to different bandwidths. Specifically, the interleaving depth of the PDSCH or the PUSCH scheduled by the DCI located in the UE-specific search space is determined according to the BW1, and the interleaving depth of the PDSCH or the PUSCH scheduled by the DCI located in the common search space is determined according to the BWP bandwidth. Alternatively, the interleaving depth of the PDSCH or the PUSCH scheduled by the DCI located in the UE-specific search space is determined according to the BW1, and the interleaving depth of the PDSCH or the PUSCH scheduled by the DCI located in the common search space is determined according to the BW2.

Preferably, the interleaving depths of the PDSCHs or the PUSCHs scheduled by different types of DCI are determined according to different bandwidths. Specifically, the interleaving depth of the PDSCH or the PUSCH scheduled by the normal DCI is determined according to the BW1, and the interleaving depth of the PDSCH or the PUSCH scheduled by the fallback DCI is determined according to the BWP bandwidth. Alternatively, the interleaving depth of the PDSCH or the PUSCH scheduled by the normal DCI is determined according to the BW1, and the interleaving depth of the PDSCH or the PUSCH scheduled by the fallback DCI is determined according to the BW2.

Preferably, in configuring the transmission bandwidth of the CSI-RS or the SRS, the base station needs to ensure that the bandwidth of the CSI-RS or the SRS is located in the BW1.

Preferably, if at least part of the transmission bandwidth of the CSI-RS or the SRS configured by the base station is outside of the BW1, the UE does not receive the CSI-RS outside of the BW1, or the UE does not transmit the SRS outside of the BW1.

It is assumed that the downlink bandwidth or the uplink bandwidth within the BWP bandwidth determined according to the second type of dynamic UL/DL information, or the bandwidth of (the downlink transmission plus the flexible transmission), or the bandwidth of (the uplink transmission plus the flexible transmission) is the BW3. The UE may also determine the frequency domain resource parameters of the downlink transmission or the uplink transmission according to the BW3.

Preferably, if at least part of the transmission bandwidth of the CSI-RS or the SRS based on configuration is located outside of the BW3, the CSI-RS outside of the BW3 is not received by the UE, or the SRS outside of the BW3 is not transmitted by the UE. Preferably, if at least part of the transmission bandwidth of the CSI-RS or the SRS based on configuration is outside of the BW3, the CSI-RS is not received by the UE, or the SRS is not transmitted by the UE.

Preferably, if at least part of the transmission bandwidth of the PDSCH, the PUSCH, the PUCCH or the PRACH based on configuration is located outside of the BW3, the PDSCH, the PUSCH, the PUCCH or the PRACH outside of the BW3 is not received or transmitted by the UE. Preferably, if at least part of the transmission bandwidth of the PDSCH, the PUSCH, the PUCCH or the PRACH based on configuration is located outside of the BW3, the PDSCH, the PUSCH, the PUCCH or the PRACH is not received or transmitted by the UE. Preferably, if at least part of the transmission bandwidth of the PDSCH, the PUSCH, the PUCCH or the PRACH based on configuration is located outside of the BW3, the UE assumes that the PDSCH, the PUSCH, the PUCCH or the PRACH are performing rate matching, and avoid frequency domain resources outside of the BW3 and only maps within the BW3.

In an exemplary embodiment of the present disclosure, when at least part of the frequency domain resources in one group of PRBs are uplink resources, the one group of PRBs are not configured to be a CORESET frequency domain resource by the base station.

In an exemplary embodiment of the present disclosure, when at least part of the frequency domain resources in one PDCCH candidate are uplink resources, the one PDCCH candidate is not monitored by the UE.

In an exemplary embodiment of the present disclosure, when at least part of frequency domain resources in one PDCCH candidate are uplink resources or flexible resources, the one PDCCH candidate is not monitored by the UE.

In the exemplary embodiment of the present disclosure, in the symbol where the Synchronization/Broadcast Channel Block (SS/PBCH Block) or the CORESET 0 of the Type-0 PDCCH Common Search Space (CSS) is located, except for the frequency domain where the SS/PBCH Block or the CORESET 0 of the Type-0 PDCCH CSS is located, the UE is dynamically scheduled by the base station to transmit the PUSCH/PUCCH/PRACH/SRS.

In an exemplary embodiment of the present disclosure, except for the frequency domain region where the SS/PBCH Block or the CORESET 0 of the Type-0 PDCCH CSS is located and an adjacent section of frequency domain resources, the UE is dynamically scheduled by the base station to transmit the PUS CH/PUCCH/PRACH/SRS.

In an exemplary embodiment of the present disclosure, when the PUSCH/PUCCH/SRS resources have an intersection with resources where the SS/PBCH Block or the CORESET 0 of the Type-0 PDCCH CSS is located, the PUSCH/PUCH/SRS performs puncturing or rate matching on the intersection resources.

In an exemplary embodiment of the present disclosure, in the symbols where the PRACH resource indicated by RACH-ConfigCommon is located, the UE is scheduled to receive the PDCCH/PDSCH/CSI-RS except for the frequency domain regions where the PRACH resource are located.

In an exemplary embodiment of the present disclosure, in the symbols where the PRACH resource indicated by RACH-ConfigCommon is located, the UE is scheduled to receive the PDCCH/PDSCH/CSI-RS except for the frequency domain regions where the PRACH resource is located and an adjacent section of frequency domain resources.

In an exemplary embodiment of the present disclosure, the base station schedules the PDCCH/PDSCH/CSI-RS including the PRACH resource indicated by the RACH-ConfigCommon, the PDCCH/PDSCH/CSI-RS performs puncturing or rate matching on the resources. When the PUSCH/PUCCH/SRS resources have an intersection with resources where the SS/PBCH Block or the CORESET 0 of the Type-0 PDCCH CSS is located, the PUSCH/PUCH/SRS performs puncturing or rate matching on the intersection resources.

In an exemplary embodiment of the present disclosure, frequency domain resources that are not used for transmitting and receiving signals are determined according to the predefined rules. For example, the frequency domain resource for receiving and transmitting signals is determined according to a signaling explicitly indicated by the base station, or according to an implicit indication.

In an exemplary embodiment of the present disclosure, when at least part of the frequency domain in one group of PRBs are frequency domain resources that are not used for transmitting and receiving signals, the one group of PRBs are not configured as the CORESET frequency domain resources by the base station.

In an exemplary embodiment of the present disclosure, when at least part of frequency domain resources in one PDCCH candidate are frequency domain resources that are not used for transmitting and receiving signals, the one PDCCH candidate is not monitored by the UE.

In an exemplary embodiment of the present disclosure, when the PUSCH/PUCCH/SRS resources have an intersection with the frequency domain resources that are not used for transmitting and receiving signals, the PUSCH/PUCCH/SRS performs puncturing or rate matching on the intersection resources.

In an exemplary embodiment of the present disclosure, when the PUSCH/PUCCH/SRS resources have an intersection with the frequency domain resources that are not used for transmitting and receiving signals, the PUSCH/PUCCH/SRS is not transmitted by the UE.

In an exemplary embodiment of the present disclosure, when the PDSCH resources have an intersection with the frequency domain resources that are not used for transmitting and receiving signals, the PDSCH performs puncturing or rate matching on the intersection resources.

In an exemplary embodiment of the present disclosure, when the PDSCH resource has an intersection with the frequency domain resources that are not used for transmitting and receiving signals, the PDSCH is not received by the UE.

In an exemplary embodiment of the present disclosure, when the CSI-RS resources have an intersection with the frequency domain resources that are not used for transmitting and receiving signals, the CSI-RSs on the intersection resources are not received by the UE.

In an exemplary embodiment of the present disclosure, when the CSI-RS resources have an intersection with the frequency domain resources that are not used for transmitting and receiving signals, the CSI-RS is not received by the UE.

In an exemplary embodiment of the present disclosure, when it is determined through the dynamic UL/DL information that the frequency domain region 1 and the frequency domain region 2 in conflicting directions are included within the same symbol, the boundary of frequency domain region 1 or the frequency domain region 2 is used as a starting point to preset PRBs that are not used for transmitting and receiving signals.

In an exemplary embodiment of the present disclosure, the uplink or downlink signals that are semi-statically configured by the base station are not transmitted and received within the preset PRBs, and the uplink or downlink signals that are dynamically scheduled by the base station are transmitted and received according to the scheduling information, regardless of the impact of the preset PRBs.

In the prior art, the base station cannot configure the slots/symbols where the PDCCH search space is located to be uplink slots/symbols. In the present disclosure, since the uplink/downlink attributes of different parts of frequency domain resources in one slot/symbol may be different, there may be different uplink/downlink attributes in the frequency domain resources of the slots/symbols where the PDCCH search space is located. In order to avoid the overlapping of PDCCH resources and configured uplink resources, in an implementation manner, the base station can completely avoid uplink resources by configuring the frequency domain resources of the CORESET. If the minimum granularity of the frequency domain resources of the CORESET is a set of PRBs with a predefined size (e.g., a group of 6 PRBs), and if at least one PRB in this group is uplink resource, this group of PRBs cannot be included in the CORESET frequency domain resource configured by the base station.

When one group of PRBs as the minimum granularity of the frequency domain resources of the CORESET include multiple PRBs, the flexibility of configuration is limited. In order to both ensure the flexibility of configuration and avoid the overlapping of the PDCCH resources and the configured uplink resources, resources in the PDCCH search space may be allowed to include uplink resources. However, when the UE monitors the PDCCH candidates, if at least one RE of one PDCCH candidate is determined to be an uplink resource according to the cell common UL/DL information or the UE-specific UL/DL information, the UE is not required to monitor this PDCCH candidate. For example, in slot n, the PDCCH search space is the 25th to 36th PRBs of the 1st to 3rd symbols. According to the second type of UE-specific UL/DL information, it is determined that the 1st to 25th PRBs of the 1st to 3rd symbols are uplink resources, and the 26th to 100th PRBs are downlink resources. Then, in the PDCCH search space, the UE determines that the base station will not transmit the PDCCH at the PDCCH candidate position containing the 25th PRB. For example, the UE does not need to monitor the PDCCH candidates corresponding to the 25th to 26th PRBs and with an aggregation level AL=1. Preferably, when the UE monitors the PDCCH candidates, if at least one resource element (RE) of one PDCCH candidate is determined to be uplink resource or flexible resource according to the dynamic UL/DL information, the UE is not required to monitor this PDCCH candidate.

In the prior art, since the uplink/downlink attributes of all frequency domain resources within one slot/symbol are the same, in order to avoid interference on important signals, in symbols containing these important signals, signals with the uplink/downlink attribute conflicting to that of these important signal cannot be transmitted or received. For example, the UE cannot transmit the PUSCH/PUCCH/PRACH/SRS on the symbols where the Synchronization/Broadcast Channel Block (SS/PBCH Block) is located. In the present disclosure, the uplink/downlink attributes of different parts of the frequency domain resources in one slot/symbol may be different, so it is possible to transmit or receive signals with uplink/downlink attributes different from those of the important signals on resources other than the frequency domain resources occupied by the important signals. Preferably, in the symbol where the SS/PBCH Block or the CORESET 0 of the Type-0 PDCCH CSS is located, except for the frequency domain regions where the SS/PBCH Block or the CORESET 0 of the Type-0 PDCCH CSS is located, the UE can be dynamically scheduled by the base station to transmit the PUSCH/PUCCH/PRACH/SRS. As shown in the example of FIG. 4*a*, the BWP1 contains three frequency domain regions. In slot 5, frequency domain region 2 is uplink and frequency domain region 3/4 is downlink. It is assumed that SS/PBCH Block is located in frequency domain region 3, then, in the symbol where the SS/PBCH Block is located, the UE cannot transmit the PUSCH/PUCCH/PRACH/SRS containing any PRB of the frequency domain region 3, but the base station can schedule the PUSCH/PUCCH/PRACH/SRS, the frequency domain resources of which are only located in the frequency domain region 2. Preferably, in the symbol where the SS/PBCH Block or the CORESET 0 of the Type-0 PDCCH CSS is located, the base station cannot schedule the UE to transmit the PUSCH/PUCCH/PRACH/SRS, and its frequency domain resources include the PRB where the SS/PBCH Block or the CORESET 0 of the Type-0 PDCCH CSS is located and the frequency domain resources of a certain frequency domain guard band, that is, the base station can only schedule the UE to transmit the PUSCH/PUCCH/PRACH/SRS outside of the PRB where the SS/PBCH Block or the CORESET 0 of the Type-0 PDCCH CSS is located and the frequency domain resources of the frequency domain guard band. For example, the SS/PBCH Block occupies N1 PRBs and the frequency domain guard band is N2 PRBs. Then, in the symbol where the SS/PBCH Block or the CORESET 0 of the Type-0 PDCCH CSS is located, the base station cannot schedule the PUSCH/PUCCH/PRACH/SRS containing the N1+N2 PRBs. Preferably, the base station can schedule the PUSCH/PUCCH/SRS that contains the resources where the SS/PBCH Block or the CORESET 0 of the Type-0 PDCCH CSS is located, and the PUSCH/PUCH/SRS performs puncturing or rate matching on these resources to avoid the overlapping resources.

Similarly, in the symbol containing the PRACH resource indicated by the RACH-ConfigCommon, except for the frequency domain region where the PRACH resource is located, the base station can schedule and transmit the PDCCH/PDSCH/CSI-RS of other frequency domain regions. As shown in the example of FIG. 4*a*, the BWP1 contains three frequency domain regions. In slot 5, frequency domain region 2 is uplink and frequency domain region 3/4 is downlink. It is assumed that the PRACH resource indicated by RACH-ConfigCommon is located in frequency domain region 2. Then, in the symbol where the PRACH resource is located, the base station cannot schedule and transmit a PDSCH including any PRB in the frequency domain region 2, but the base station can schedule and transmit the PDSCH, and the frequency domain resources of the scheduled PDSCH are only located in the frequency domain region 3/4. Preferably, in the symbol where the PRACH resource indicated by the RACH-ConfigCommon is located, the base station cannot transmit the PDCCH/PDSCH/CSI-RS on the frequency domain resources including the PRB where the PRACH resource is located and a certain frequency domain guard band. Preferably, the base station may schedule the PDCCH/PDSCH/CSI-RS, the frequency domain resources of which include the PDCCH/PDSCH/CSI-RS of the PRACH resource indicated by the RACH-ConfigCommon, but the base station needs to perform puncturing or rate matching on these resources to avoid the overlapping resources when transmitting the PDCCH/PDSCH/CSI-RS.

When there are frequency domain resources in different transmission directions in one slot/symbol, it is usually necessary to reserve a guard band on the frequency domain between these frequency domain resources to reduce the crosstalk of signals in different directions. According to one implementation manner, the base station avoids scheduling or configuring the UE to transmit and receive signals on such a guard band. This guard band may be transparent to the UE. According to another implementation manner, the base station informs the UE of the guard band, or the UE determines which frequency domain resources cannot be used to transmit and receive signals according to the predefined rules. For example, when the UE determines that the second type of cell common UL/DL information or the second type of UE-specific UL/DL information contains the frequency domain region 1 and the frequency domain region 2 in conflicting directions in the same symbol, it is not possible for the UE to transmit and receive signals within preset X PRBs starting from the boundary of the frequency domain region 1. Alternatively, it is not possible for the UE to transmit and receive signals within preset Y PRBs starting from the boundary of the frequency domain region 2.

Preferably, the UE determines through the dynamic UL/DL information that the frequency domain region 1 and the frequency domain region 2 in the conflicting directions are included within the same symbol, then it is not possible for the UE to transmit and receive signals within the preset X PRBs starting from the boundary of the frequency domain region 1. Alternatively, it is not possible for the UE to transmit and receive signals within the preset Y PRBs starting from the boundary of the frequency domain region 2.

FIG. 6 illustrates a schematic diagram of a guard band on a frequency domain reserved between frequency domain resources according to an exemplary embodiment of the present disclosure. As shown in FIG. 6, in the 2nd to 5th slots, the frequency domain region 1 is an uplink region, and the frequency domain region 2 is a downlink region. There is no interval between these two frequency domain regions. The X PRBs from the lower edge of the frequency domain region 1 toward the frequency domain region 2 is a preset frequency domain guard band. During this guard band, the UE can neither receive downlink signals nor transmit uplink signals.

Preferably, the uplink or downlink signals that are semi-statically configured by the base station are not transmitted and received within the preset X or Y PRBs, and the uplink or downlink signals that are dynamically scheduled by the base station are transmitted and received according to the scheduling information, regardless of the impact of the preset X or Y PRBs.

The signal transmission method for UE according to the exemplary embodiments of the present disclosure has been described above with reference to FIG. 1 to FIG. 6. Hereinafter, a signal transmission device for UE and units thereof according to the exemplary embodiments of the present disclosure will be described with reference to FIG. 7.

Figure 7:
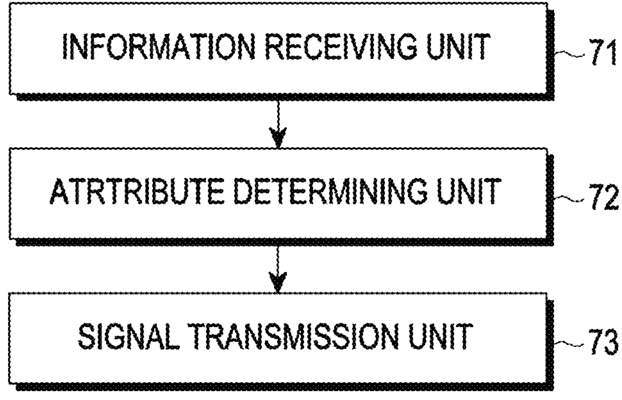
FIG. 7 illustrates a block diagram of a signal transmission device for UE according to an exemplary embodiment of the present disclosure.

FIG. 7 illustrates a block diagram of a signal transmission device for UE according to an exemplary embodiment of the present disclosure.

Referring to FIG. 7, the signal transmission device for UE includes an information receiving unit 71, an attribute determining unit 72 and a signal transmission unit 73.

The information receiving unit 71 is configured to receive information for determining an uplink/downlink attribute of each frequency domain resource in each slot/symbol transmitted by the base station.

In an exemplary embodiment of the present disclosure, the information for determining the uplink/downlink attribute of each frequency domain resource in each slot/symbol may include at least one of cell common UL/DL information, UE-specific UL/DL information, and dynamic UL/DL information. Wherein the cell common UL/DL information includes a first type of cell common UL/DL information and/or a second type of cell common UL/DL information, the UE-specific UL/DL information includes a first type of UE-specific UL/DL information and/or a second type of UE-specific UL/DL information, the dynamic UL/DL information includes a first type of dynamic UL/DL information and/or a second type of dynamic UL/DL information.

In an exemplary embodiment of the present disclosure, the first type of cell common UL/DL information includes information on the uplink/downlink attribute in the time dimension, and is used to indicate that one slot/symbol is an uplink slot/symbol, a downlink slot/symbol or a flexible slot/symbol, wherein the uplink/downlink attributes of all frequency domain resources in each slot/symbol are the same.

In an exemplary embodiment of the present disclosure, the second type of cell common UL/DL information includes information on the uplink/downlink attributes in the time dimension and the frequency domain dimension, and is used to indicate that each frequency domain resource of one slot/symbol is an uplink transmission resource, a downlink transmission resource, or a flexible transmission resource.

In an exemplary embodiment of the present disclosure, the first type of UE-specific UL/DL information includes information on the uplink/downlink attribute in the time dimension, and is used to indicate that one slot/symbol is an uplink slot/symbol, a downlink slot/symbol or a flexible slot/symbol, wherein the uplink/downlink attributes of all frequency domain resources in each slot/symbol are the same.

In an exemplary embodiment of the present disclosure, the second type of UE-specific UL/DL information includes information on the uplink/downlink attributes in the time dimension and the frequency domain dimension, and may be used to indicate that each frequency domain resource of one slot/symbol is an uplink transmission resource, a downlink transmission resource, or a flexible transmission resource.

In an exemplary embodiment of the present disclosure, the first type of dynamic UL/DL information includes information on the uplink/downlink attribute in the time dimension, and is used to indicate that one slot/symbol is an uplink slot/symbol, a downlink slot/symbol or a flexible slot/symbol, wherein the uplink/downlink attributes of all frequency domain resources in each slot/symbol are the same.

In an exemplary embodiment of the present disclosure, the second type of dynamic UL/DL information includes information on the uplink/downlink attributes in the time dimension and the frequency domain dimension, and is used to indicate that each frequency domain resource of one slot/symbol is an uplink transmission resource, a downlink transmission resource, or a flexible transmission resource.

In an exemplary embodiment of the present disclosure, the second type of cell common UL/DL information, the second type of UE-specific UL/DL information and the second type of dynamic UL/DL information are used to indicate the uplink/downlink attribute of each frequency domain resource in the carrier where the cell is located.

In an exemplary embodiment of the present disclosure, the second type of UE-specific UL/DL information and the second type of dynamic UL/DL information are used to indicate the uplink/downlink attributes of the configured BWPs, wherein the uplink/downlink attributes of different BWPs are configured separately.

In an exemplary embodiment of the present disclosure, the uplink/downlink attribute of each frequency domain resource of one slot/symbol in one BWP may be configured separately, and the uplink/downlink attributes of different frequency domain resources cannot be conflicting, or the uplink/downlink attributes of different frequency domain resources are conflicting, wherein the "confliction" means that the uplink attribute and the downlink attribute appear simultaneously in the uplink/downlink attributes of different frequency domain resources.

In an exemplary embodiment of the present disclosure, for one slot/symbol, there are no more than two types of uplink/downlink attributes for each frequency domain resource within one carrier bandwidth or within one BWP, or, for one slot/symbol, the frequency domain resources within the carrier bandwidth only support a specific uplink/downlink attribute combination.

In an exemplary embodiment of the present disclosure, in a specific slot/symbol, all frequency domain regions are configured with the same uplink/downlink attribute, or, in the specific slot/symbol, the different frequency domain regions are not configured with conflicting uplink/downlink attributes, or, in the specific slot/symbol, a specific frequency domain region is configured with a specific uplink/downlink attribute.

In an exemplary embodiment of the present disclosure, second type of dynamic UL/DL information is used to indicate the uplink/downlink attribute of each frequency domain resource in the carrier where the cell is located.

In an exemplary embodiment of the present disclosure, the second type of dynamic UL/DL information is used to indicate the uplink/downlink attributes of the configured BWPs, wherein the uplink/downlink attributes of different BWPs are independently configured.

In an exemplary embodiment of the present disclosure, the uplink/downlink attributes in all frequency domain resources of one slot/symbol in the BWP are the same, or include uplink transmission and flexible transmission, or include downlink transmission and flexible transmission, or only include flexible transmission.

In an exemplary embodiment of the present disclosure, the second type of dynamic UL/DL information indicates the uplink/downlink attribute of each frequency domain region of the carrier where the serving cell is located.

In an exemplary embodiment of the present disclosure, the second type of UE-specific UL/DL information indicates that all frequency domain resources in one BWP have the same uplink/downlink attribute, or all frequency domain resources in one BWP cannot contain the conflicting uplink/downlink attributes. The second type of dynamic UL/DL information indicates that the uplink/downlink attributes of all frequency domain resources in one BWP are the same, and the uplink/downlink attributes of different BWPs are the same or different.

In an exemplary embodiment of the present disclosure, the second type of dynamic UL/DL information of one or more serving cells is carried by the same DCI, and the second type of dynamic UL/DL information of different BWPs are independently determined.

In an exemplary embodiment of the present disclosure, the second type of dynamic UL/DL information is used to indicate the uplink/downlink attributes of the BWPs, or, the second type of dynamic UL/DL information is used to indicate the uplink/downlink attribute of each frequency domain region of the BWP.

In an exemplary embodiment of the present disclosure, both of the first type of cell common UL/DL information and the second type of cell common UL/DL information indicate the uplink/downlink attributes of the frequency domain regions in the symbols, and the indicated part of frequency domain regions have the same uplink/downlink attribute, or, both of the first type of cell common UL/DL information and the second type of UE-specific UL/DL information indicate the uplink/downlink attributes of the frequency domain regions in the symbols, and the indicated part of frequency domain regions have the same uplink/downlink attribute, or, both of the first type of semi-static UL/DL information and the second type of dynamic UL/DL information indicate the uplink/downlink attributes of the frequency domain regions in the symbols, and the indicated part of frequency domain regions have the same uplink/downlink attribute, herein, the first type of semi-static UL/DL information comprises the first type of cell common UL/DL information and/or the first type of UE-specific UL/DL information. Herein, at least parts of the frequency domain resources are configured by the base station or are predefined.

The attribute determining unit 72 is configured to determine the uplink/downlink attribute of each time-frequency resource according to the information for determining the uplink/downlink attribute of each frequency domain resource in each slot/symbol.

In an exemplary embodiment of the present disclosure, the attribute determining unit 72 may be configured to determine the uplink/downlink attribute of each time-frequency resource according to the second type of cell common UL/DL information or according to the first type of cell common UL/DL information and the second type of cell common UL/DL information, or, to determine the uplink/downlink attribute of each frequency domain region of the carrier where the serving cell is located according to the second type of UE-specific UL/DL information and the first type of cell common UL/DL information, or, to determine the uplink/downlink attribute of each frequency domain region of the carrier where the serving cell is located only according to the second type of UE-specific UL/DL information.

In an exemplary embodiment of the present disclosure, the attribute determining unit 72 may be configured to determine the uplink/downlink attribute of each slot/symbol of the BWP according to a frequency domain position of the BWP and each frequency domain region of the carrier where the serving cell is located, wherein each frequency domain region in the carrier where the serving cell is located is indicated by at least one of the second type of cell common UL/DL information, the second type of UE-specific UL/DL information, and the second type of dynamic UL/DL information.

The signal transmission unit 73 is configured to performing signal transmission according to the determined uplink/downlink attribute of each time-frequency resource.

In an exemplary embodiment of the present disclosure, the signal transmission unit 73 may be configured to determine the frequency domain resource parameters for downlink transmission or uplink transmission according to a first bandwidth BW1, when a bandwidth for downlink transmission, or a bandwidth for uplink transmission, or a bandwidth for downlink transmission and flexible transmission, or a bandwidth for uplink transmission and flexible transmission within the BWP bandwidth determined according to the second type of UE-specific UL/DL information is the BW1, or, to determine the frequency domain resource parameters for downlink or uplink transmission according to a second bandwidth BW2, when the bandwidth for downlink transmission, or the bandwidth for uplink transmission, or the bandwidth for downlink transmission and flexible transmission, or the bandwidth for uplink transmission and flexible transmission within the BWP bandwidth determined according to the second type of cell common UL/DL information is the BW2, or, to determine the frequency domain resource parameters for downlink or the uplink transmission according to a third bandwidth BW3, when the bandwidth for downlink transmission, or the bandwidth for uplink transmission, or the bandwidth for downlink transmission and flexible transmission, or the bandwidth for uplink transmission and flexible transmission within the BWP bandwidth determined according to the second type of dynamic UL/DL information is the BW3 .

In an exemplary embodiment of the present disclosure, frequency domain resources allocated by the base station for PDSCH or PUSCH are limited within the BW1, or, the frequency domain resources allocated by the base station for the PDSCH or the PUSCH are limited within the BW2, or, a transmission bandwidth configured by the base station for CSI-RS or SRS is limited within the BW1, or, when at least part of the transmission bandwidth of the CSI-RS or the SRS is located outside of the BW1 , the CSI-RS outside of the BW1 is not received by the UE, or the SRS outside of the BW1 is not transmitted by the UE, or, when at least part of the transmission bandwidth of the CSI-RS or the SRS based on configuration is located outside of the BW3, the CSI-RS outside of the BW3 is not received by the UE, or the SRS outside of the BW3 is not transmitted by the UE, or the CSI-RS is not received by the UE, or the SRS is not transmitted by the UE, or, when at least part of the transmission bandwidth of the PDSCH, the PUSCH, Physical Uplink Control Channel (PUCCH) or Physical Random Access Channel (PRACH) based on configuration is located outside of the BW3, the PDSCH, the PUSCH, the PUCCH or the PRACH outside of the BW3 is not received or transmitted by the UE, or, the PDSCH, the PUSCH, the PUCCH or the PRACH is not received or transmitted by the UE, or, when at least part of the transmission bandwidth of the PDSCH, the PUSCH, the PUCCH or the PRACH based on configuration is located outside of the BW3, the frequency domain resources outside of the BW3 are not mapped to by means of rate matching or puncturing.

In an exemplary embodiment of the present disclosure, the signal transmission unit 73 may be further configured to determine the number of bits for frequency domain resource allocation bit field in the DCI for scheduling the PDSCH or the PUSCH according to the BW1, or, to determine the number of bits for frequency domain resource allocation bit field in the DCI for scheduling the PDSCH or the PUSCH and located in the UE-specific search space according to the BW1, and to determine the number of bits for frequency domain resource allocation bit field in the DCI located in the cell common search space according to the BWP bandwidth, or, to determine the number of bits for frequency domain resource allocation bit field in normal DCI for scheduling the PDSCH or the PUSCH according to the BW1, and to determine the number of bits for frequency domain resource allocation bit field in fallback DCI according to the BWP bandwidth, or, to determine the number of bits for frequency domain resource allocation bit field in the DCI for scheduling the PDSCH or the PUSCH and located in the UE-specific search space according to the BW1, and to determine the number of bits for frequency domain resource allocation bit field in the DCI located in the cell common search space according to the BW2, or, to determine the number of bits for frequency domain resource allocation bit field in the normal DCI for scheduling the PDSCH or the PUSCH according to the BW1, and to determine the number of bits for frequency domain resource allocation bit field in the fallback DCI according to the BW2.

In an exemplary embodiment of the present disclosure, the signal transmission unit 73 may be further configured to determine a RBG size according to the BW1 when the frequency domain resources of the PDSCH or the PUSCH are allocated based on the RBG, or, to determine a RBG size of the PDSCH or the PUSCH scheduled by DCI located in a UE-specific search space according to the BW1, and to determine a RBG size of the PDSCH or the PUSCH scheduled by DCI located in a common search space according to the BWP bandwidth, or, to determine a RBG size of the PDSCH or the PUSCH scheduled by normal DCI according to the BW1, and to determine a RBG size of the PDSCH or the PUSCH scheduled by fallback DCI according to the BWP bandwidth, or, to determine the RBG size of the PDSCH or the PUSCH scheduled by the DCI located in the UE-specific search space according to the BW1, and to determine the RBG size of the PDSCH or the PUSCH scheduled by the DCI located in the common search space according to the BW2, or, to determine the RBG size of the PDSCH or the PUSCH scheduled by the normal DCI according to the BW1, and to determine the RBG size of the PDSCH or the PUSCH scheduled by the fallback DCI according to the BW2, or, to determine an interleaving depth according to the BW1 when the frequency domain resources of the PDSCH or the PUSCH are allocated based on interleaving, or, to determine an interleaving depth of the PDSCH or the PUSCH scheduled by the DCI located in the UE-specific search space according to the BW1, and to determine an interleaving depth of the PDSCH or the PUSCH scheduled by the DCI located in the common search space according to the BWP bandwidth, or, to determine an interleaving depth of the PDSCH or the PUSCH scheduled by the normal DCI according to the BW1, and to determine an interleaving depth of the PDSCH or the PUSCH scheduled by the fallback DCI according to the BWP bandwidth, or, to determine the interleaving depth of the PDSCH or the PUSCH scheduled by the DCI located in the UE-specific search space according to the BW1 , and to determine the interleaving depth of the PDSCH or the PUSCH scheduled by the DCI located in the common search space according to the BW2, or, to determine the interleaving depth of the PDSCH or the PUSCH scheduled by the normal DCI according to the BW1, and to determine the interleaving depth of the PDSCH or the PUSCH scheduled by the fallback DCI according to the BW2.

In an exemplary embodiment of the present disclosure, when at least part of the frequency domain resources in a group of PRBs are uplink resources, the group of PRBs is not configured to be CORESET frequency domain resources by the base station, or, when at least part of frequency domain resources in one PDCCH candidate are the uplink resources, the one PDCCH candidate is not monitored by the UE, or, when at least part of frequency domain resources in one PDCCH candidate are the uplink resources or flexible resources, the one PDCCH candidate is not monitored by the UE.

In addition, according to the exemplary embodiments of the present disclosure, a computer readable storage medium stored with a computer program is provided. When the computer program is executed the signal transmission method for UE according to the present disclosure is implemented.

In an exemplary embodiment of the present disclosure, the computer readable storage medium can carry one or more programs that, when executed, the follow steps may be implemented: receiving information for determining uplink/downlink attribute of each frequency domain resource in each slot/symbol transmitted by the base station, determining the uplink/downlink attribute of each time-frequency resource according to the information for determining the uplink/downlink attribute of each frequency domain resource in each slot/symbol, and performing signal transmission according to the determined uplink/downlink attribute of each time-frequency resource.

The computer readable storage medium may be, for example, but not limited to, an electronic, magnetic, optical, electromagnetic, infrared, or semiconductor system, device, or, equipment or any combination of the above. More specific examples of computer readable storage media may include, but not limited to, electrical connections having one or more wires, portable computer disks, hard disks, random access memory (RAM), read only memory (ROM), erasable Programmable read only memory (EPROM or flash memory), optical fiber, portable compact disk read only memory (CD-ROM), optical storage device, magnetic storage device, or any suitable combination of the above mentioned. In the embodiments of the present disclosure, a computer readable storage medium may be any tangible medium that can contain or store a computer program, which can be used by or in connection with an instruction execution system, device, or, equipment. The computer program embodied on the computer readable storage medium can be transmitted by any suitable medium, including but not limited to: wire, fiber optic cable, RF (radio frequency), etc., or any suitable combination of the foregoing. The computer readable storage medium can be included in any device; it can also be present separately and not incorporated into the device.

The signal transmission device for UE according to the exemplary embodiments of the present disclosure has been described above with reference to FIG. 7. Hereinafter, an electronic apparatus according to the exemplary embodiments of the present disclosure will be described with reference to FIG. 8.

Figure 8:
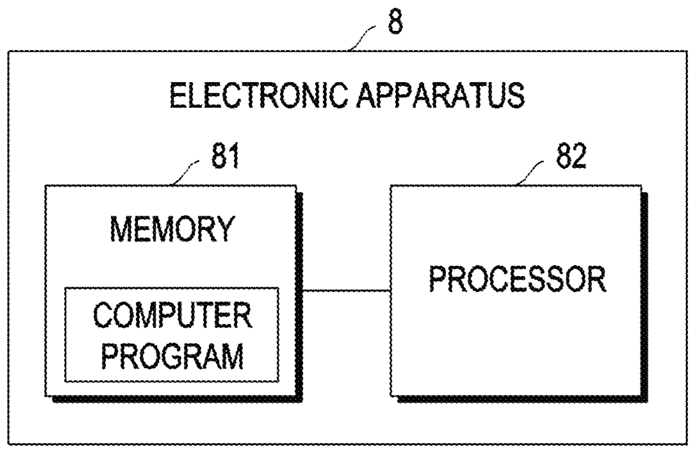
FIG. 8 illustrates a schematic diagram of an electronic device according to an exemplary embodiment of the present disclosure.

FIG. 8 illustrates a schematic diagram of an electronic apparatus, according to an exemplary embodiment of the present disclosure.

Referring to FIG. 8, an electronic apparatus 8 according to an exemplary embodiment of the present disclosure includes a memory 81, a processor 82, and a computer program which is stored on the memory and operable on the processor 82, and when the computer program is executed by the processor 82, signal transmission method for UE according to the present disclosure is implemented.

In an exemplary embodiment of the present disclosure, when the computer program is executed by a processor 82, the follow steps may be implemented: receiving information for determining uplink/downlink attribute of each frequency domain resource in each slot/symbol transmitted by the base station, determining the uplink/downlink attribute of each time-frequency resource according to the information for determining the uplink/downlink attribute of each frequency domain resource in each slot/symbol, and performing signal transmission according to the determined uplink/downlink attribute of each time-frequency resource.

The electronic apparatus shown in FIG. 8 is only an example, and should not impose any limitation on the functions and scope of use of the embodiments of the present disclosure.

The signal transmission method and device for UE according to an exemplary embodiment of the present disclosure have been described above with reference to FIGS. 1-8. However, it should be understood that the signal transmission device for UE and units therein shown in FIG. 7 may be respectively configured to execute software, hardware, firmware, or any combination of them of a specific function. The electronic apparatus as shown in FIG. 8 is not limited to including the components shown above, but some components may be added or deleted as needed, and the above components may also be combined.

While the present disclosure has been shown and described with reference to certain exemplary embodiments thereof, it should be understood by those skilled in the art that various changes in form and details may be made therein without departing from the principle of the present disclosure which are defined by the appended claims.

The invention claimed is:

1. A method performed by a user equipment (UE) in a wireless communication system, the method comprising:

receiving, from a base station, first configuration information indicating that a symbol is an uplink (UL) symbol or a downlink (DL) symbol;

receiving, from the base station, second configuration information for identifying which frequency domain resource is for UL and which frequency domain resource is for DL in the symbol;

identifying frequency domain resources for UL and frequency domain resources for DL in the symbol based on the first configuration information and the second configuration information; and performing signal transmission on the frequency domain resources for UL or signal reception on the frequency domain resources for DL, in the symbol.

2. The method of claim 1, wherein the first configuration information and the second configuration information include at least one of cell common UL/DL information, UE-specific UL/DL information, and dynamic UL/DL information, wherein the cell common UL/DL information includes a first type of cell common UL/DL information and a second type of cell common UL/DL information, wherein the UE-specific UL/DL information includes a first type of UE-specific UL/DL information and a second type of UE-specific UL/DL information, and wherein the dynamic UL/DL information includes a first type of dynamic UL/DL information and a second type of dynamic UL/DL information.

3. The method of claim 2, wherein the first type of cell common UL/DL information, the first type of UE-specific UL/DL information and the first type of dynamic UL/DL information include information on UL/DL configuration, and are used to indicate that one slot/symbol is an UL slot/symbol, a DL slot/symbol or a flexible slot/symbol, wherein the UL/DL configuration of all frequency domain resources in each slot/symbol are the same, and wherein the second type of cell common UL/DL information, the second type of UE-specific UL/DL information and the second type of dynamic UL/DL information include information on UL/DL configuration, and are used to indicate that each frequency domain resource of one slot/symbol is an UL transmission resource, a DL transmission resource, or a flexible transmission resource.

4. The method of claim 3, wherein the second type of cell common UL/DL information, the second type of UE-specific UL/DL information, and the second type of dynamic UL/DL information are used to indicate UL/DL configuration of each frequency domain resource in a carrier where a cell is located, or wherein the second type of UE-specific UL/DL information and the second type of dynamic UL/DL information are used to indicate UL/DL configuration of configured bandwidth parts (BWPs), wherein the UL/DL configuration of different BWPs are configured separately, wherein the UL/DL configuration of each frequency domain resource of one slot/symbol in one BWP is configured separately, wherein UL/DL configurations of different frequency domain resources are not conflicting, or UL/DL configuration of different frequency domain resources are conflicting, wherein the confliction denotes that UL configuration and DL configuration appear simultaneously in the UL/DL configurations of different frequency domain resources, and wherein, in a specific slot/symbol, all frequency domain resources are configured with the same UL/DL configuration, the different frequency domain resources are not configured with conflicting UL/DL configuration, or a specific frequency domain resource is configured with a specific UL/DL configuration.

5. The method of claim 3, wherein frequency domain resources indicated by the second type of cell common UL/DL configuration are configured as DL reception by the first type of cell common UL/DL configuration.

6. The method of claim 3, wherein both of the first type of cell common UL/DL information and the second type of cell common UL/DL information indicate UL/DL configurations of the frequency domain resources in symbols, and the indicated part of frequency domain resources have the same UL/DL configuration, or wherein both of the first type of cell common UL/DL information and the second type of UE-specific UL/DL information indicate UL/DL configurations of the frequency domain resources in the symbols, and the indicated part of frequency domain resources have the same UL/DL configuration, or wherein both of a first type of semi-static UL/DL information and the second type of dynamic UL/DL information indicate UL/DL configurations of the frequency domain resources in the symbols, and the indicated part of frequency domain resources have the same UL/DL configuration, wherein the first type of semi-static UL/DL information comprises the first type of cell common UL/DL information and/or the first type of UE-specific UL/DL information, and wherein at least part of the frequency domain resources are configured by the base station or are predefined.

7. The method of claim 2, wherein the identifying of resources for UL and the identifying of resources for DL comprises:

determining UL/DL configurations of frequency domain resources in a slot or symbol, according to the second type of cell common UL/DL information or according to the first type of cell common UL/DL information and the second type of cell common UL/DL information, or, determining UL/DL configurations of frequency domain resources of a carrier where a serving cell is located according to the second type of UE-specific UL/DL information and the first type of cell common UL/DL information, or determining UL/DL configurations of frequency domain resources of the carrier where the serving cell is located only according to the second type of UE-specific UL/DL information.

8. The method of claim 2, wherein the identifying of resources for UL and the identifying of resources for DL comprises:

determining UL/DL configurations of slot/symbols of a bandwidth part (BWP) according to a frequency domain position of the BWP and each frequency domain resource of a carrier where a serving cell is located, and wherein the each frequency domain resource of the carrier is indicated by at least one of the second type of cell common UL/DL information, the second type of UE-specific UL/DL information, and the second type of dynamic UL/DL information.

9. The method of claim 2, wherein performing signal transmission on the frequency domain resources for UL or signal reception on the frequency domain resources for DL comprises:

determining frequency domain resource parameters for DL reception or UL transmission according to a first bandwidth (BW1), in case that a bandwidth for DL transmission, or a bandwidth for UL transmission, or a bandwidth for DL transmission and flexible transmission, or a bandwidth for UL transmission and flexible transmission within a BWP bandwidth determined according to the second type of UE-specific UL/DL information is the BW1, or determining frequency domain resource parameters for DL reception or UL transmission according to a second bandwidth (BW2), in case that the bandwidth for DL transmission, or the bandwidth for UL transmission, or the bandwidth for DL transmission and flexible transmission, or the bandwidth for UL transmission and flexible transmission within the BWP bandwidth determined according to the second type of cell common UL/DL information is the BW2, or determining frequency domain resource parameters for DL reception or the UL transmission according to a third bandwidth (BW3), in case that the bandwidth for DL transmission, or the bandwidth for UL transmission, or the bandwidth for DL transmission and flexible transmission, or the bandwidth for UL transmission and flexible transmission within the BWP bandwidth determined according to the second type of dynamic UL/DL information is the BW3.

10. The method of claim 9, wherein frequency domain resources allocated by the base station for physical DL shared channel (PDSCH) or physical uplink shared channel (PUSCH) are limited within the BW1, or wherein the frequency domain resources allocated by the base station for the PDSCH or the PUSCH are limited within the BW2, or wherein a transmission bandwidth configured by the base station for channel state information-reference signal (CSI-RS) or sounding reference signal (SRS) is limited within the BW1, or wherein in case that at least part of the transmission bandwidth of the CSI-RS or the SRS is located outside of the BW1, the CSI-RS outside of the BW1 is not received by the UE, or the SRS outside of the BW1 is not transmitted by the UE, or, wherein in case that at least part of the transmission bandwidth of the CSI-RS or the SRS based on configuration is located outside of the BW3, the CSI-RS outside of the BW3 is not received by the UE, or the SRS outside of the BW3 is not transmitted by the UE, or the CSI-RS is not received by the UE, or the SRS is not transmitted by the UE, or wherein in case that at least part of the transmission bandwidth of the PDSCH, the PUSCH, physical uplink control channel (PUCCH) or physical random access channel (PRACH) based on configuration is located outside of the BW3, the PDSCH, the PUSCH, the PUCCH or the PRACH outside of the BW3 is not received or transmitted by the UE, or, the PDSCH, the PUSCH, the PUCCH or the PRACH is not received or transmitted by the UE, or wherein in case that at least part of the transmission bandwidth of the PDSCH, the PUSCH, the PUCCH or the PRACH based on configuration is located outside of the BW3, the frequency domain resources outside of the BW3 are not mapped to by way of rate matching or puncturing, and wherein the determining of the frequency domain resource parameters for DL reception or UL transmission comprises:

determining a resource block group (RBG) size according to the BW1in case that frequency domain resources of the PDSCH or the PUSCH are allocated based on the RBG, or determining a RBG size of the PDSCH or the PUSCH scheduled by downlink control information (DCI) located in a UE-specific search space according to the BW1, and determining a RBG size of the PDSCH or the PUSCH scheduled by DCI located in a common search space according to the BWP bandwidth, or determining a RBG size of the PDSCH or the PUSCH scheduled by normal DCI according to the BW1, and determining a RBG size of the PDSCH or the PUSCH scheduled by fallback DCI according to the BWP bandwidth, or determining the RBG size of the PDSCH or the PUSCH scheduled by the DCI located in the UE-specific search space according to the BW1, and determining the RBG size of the PDSCH or the PUSCH scheduled by the DCI located in the common search space according to the BW2, or determining the RBG size of the PDSCH or the PUSCH scheduled by the normal DCI according to the BW1, and determining the RBG size of the PDSCH or the PUSCH scheduled by the fallback DCI according to the BW2.or determining an interleaving depth according to the BW1 when the frequency domain resources of the PDSCH or the PUSCH are allocated based on interleaving, or, determining an interleaving depth of the PDSCH or the PUSCH scheduled by the DCI located in the UE-specific search space according to the BW1, and determining an interleaving depth of the PDSCH or the PUSCH scheduled by the DCI located in the common search space according to the BWP bandwidth, or determining an interleaving depth of the PDSCH or the PUSCH scheduled by the normal DCI according to the BW1, and determining an interleaving depth of the PDSCH or the PUSCH scheduled by the fallback DCI according to the BWP bandwidth, or determining the interleaving depth of the PDSCH or the PUSCH scheduled by the DCI located in the UE-specific search space according to the BW1, and determining the interleaving depth of the PDSCH or the PUSCH scheduled by the DCI located in the common search space according to the BW2, or determining the interleaving depth of the PDSCH or the PUSCH scheduled by the normal DCI according to the BW1, and determining the interleaving depth of the PDSCH or the PUSCH scheduled by the fallback DCI according to the BW2.

11. The method of claim 1, wherein performing of signal transmission on the frequency domain resources for UL or signal reception on the frequency domain resources for DL comprises:

when at least part of the frequency domain resources in a group of Physical Resource Blocks (PRB) are UL resources, the group of PRBs are not configured as a Control Resource Set (CORESET) frequency domain resource by the base station, or when at least part of frequency domain resources in one Physical Downlink Control Channel (PDCCH) candidate are the UL resources, the one PDCCH candidate is not monitored by the UE, or when at least part of frequency domain resources in one PDCCH candidate are the UL resources or flexible resources, the one PDCCH candidate is not monitored by the UE, or when at least part of frequency domain resources in one group of PRBs are frequency domain resources that are not used for transmitting and receiving signals, the one group of PRBs are not configured as CORESET frequency domain resources by the base station, or when at least part of the frequency domain resources in one PDCCH candidate are frequency domain resources that are not used for transmitting and receiving signals, the one PDCCH candidate is not monitored by the UE.

12. The method of claim 1, wherein transmission starting point related to frequency hopping in the symbol is determined based on the second configuration information.

13. A method performed by a base station in a wireless communication system, the method comprising:

transmitting first configuration information indicating that a symbol is an uplink (UL) symbol or a downlink (DL) symbol;

transmitting second configuration information for identifying which frequency domain resource is for UL and which frequency domain resource is for DL in a symbol; and performing signal reception on frequency domain resources for UL and signal transmission on frequency domain resources for DL in the symbol, based on the first configuration information and the second configuration information.

14. A base station in a wireless communication, the base station comprising:

a transceiver; and at least one processor coupled to the transceiver, wherein the at least one processor is configured to:

transmit first configuration information indicating that a symbol is an uplink (UL) symbol or a downlink (DL) symbol, transmit second configuration information for identifying which frequency domain resource is for UL and which frequency domain resource is for DL in a symbol, and perform signal reception on frequency domain resources for UL and signal transmission on frequency domain resources for DL in the symbol, based on the first configuration information and the second configuration information.

15. A user equipment (UE) in a wireless communication system, the UE comprising:

a transceiver; and at least one processor coupled to the transceiver, wherein the at least one processor is configured to:

receive, from a base station, first configuration information indicating that a symbol is an uplink (UL) symbol or a downlink (DL) symbol, receive, from the base station, second configuration information resource is for UL and which frequency domain resource is for DL in the symbol, identify frequency domain resources for UL and frequency domain resources for DL in the symbol based on the first configuration information and the second configuration information, and perform signal transmission on the frequency domain resources for UL or signal reception on the frequency domain resources for DL, in the or symbol.

16. The UE of claim 15, wherein the first configuration information and the second configuration information include at least one of cell common UL/DL information, UE-specific UL/DL information, and dynamic UL/DL information, wherein the cell common UL/DL information includes a first type of cell common UL/DL information and a second type of cell common UL/DL information, wherein the UE-specific UL/DL information includes a first type of UE-specific UL/DL information and/or a second type of UE-specific UL/DL information, wherein the dynamic UL/DL information includes a first type of dynamic UL/DL information and/or a second type of dynamic UL/DL information, wherein the first type of cell common UL/DL information, the first type of UE- specific UL/DL information and the first type of dynamic UL/DL information include information on UL/DL configuration, and are used to indicate that one slot/symbol is an UL slot/symbol, a DL slot/symbol or a flexible slot/symbol, wherein the UL/DL configuration of all frequency domain resources in each slot/symbol are the same, and wherein the second type of cell common UL/DL information, the second type of UE-specific UL/DL information and the second type of dynamic UL/DL information include information on UL/DL configuration, and are used to indicate that each frequency domain resource of one slot/symbol is an UL transmission resource, a DL transmission resource, or a flexible transmission resource.

17. The UE of claim 16, wherein the second type of cell common UL/DL information, the second type of UE-specific UL/DL information, and the second type of dynamic UL/DL information are used to indicate UL/DL configuration of each frequency domain resource in a carrier where a cell is located, or wherein the second type of UE-specific UL/DL information and the second type of dynamic UL/DL information are used to indicate UL/DL configuration of configured bandwidth parts (BWPs), wherein the UL/DL configuration of different BWPs are configured separately, wherein the UL/DL configuration of each frequency domain resource of one slot/symbol in one BWP is configured separately, wherein UL/DL configurations of different frequency domain resources are not conflicting, or UL/DL configurations of different frequency domain resources are conflicting, and wherein the confliction means that UL configuration and DL configuration appear simultaneously in the UL/DL configurations of different frequency domain resources.

18. The UE according to claim 16, wherein frequency domain resources indicated by the second type of cell common UL/DL configuration are configured as DL reception by the first type of cell common UL/DL configuration, or wherein, in a specific slot/symbol, all frequency domain resources are configured with the same UL/DL configuration, or wherein, in the specific slot/symbol, different frequency domain resources are not configured with conflicting UL/DL configurations, or wherein, in the specific slot/symbol, a specific frequency domain resource is configured with a specific UL/DL configuration.

19. The UE of claim 16, wherein the at least one processor is configured to:

determine UL/DL configurations of frequency domain resources in the slot or symbol, according to the second type of cell common UL/DL information or according to the first type of cell common UL/DL information and the second type of cell common UL/DL information, or determine UL/DL configurations of frequency domain resources of a carrier where a serving cell is located according to the second type of UE-specific UL/DL information and the first type of cell common UL/DL information, or determine UL/DL configurations of frequency domain resources of the carrier where the serving cell is located only according to the second type of UE-specific UL/DL information.

* * * * *